(12) United States Patent
Ikeda et al.

(10) Patent No.: US 9,390,667 B2
(45) Date of Patent: Jul. 12, 2016

(54) METHOD FOR DRIVING INPUT-OUTPUT DEVICE, AND INPUT-OUTPUT DEVICE

(75) Inventors: Takayuki Ikeda, Kanagawa (JP); Yoshiyuki Kurokawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 119 days.

(21) Appl. No.: 13/160,825

(22) Filed: Jun. 15, 2011

(65) Prior Publication Data

US 2011/0310061 A1 Dec. 22, 2011

(30) Foreign Application Priority Data

Jun. 16, 2010 (JP) .................. 2010-137092

(51) Int. Cl.
*G06F 3/042* (2006.01)
*G09G 3/36* (2006.01)

(52) U.S. Cl.
CPC .............. *G09G 3/3648* (2013.01); *G06F 3/042* (2013.01); *G09G 2300/0809* (2013.01); *G09G 2300/0842* (2013.01); *G09G 2310/0235* (2013.01); *G09G 2310/0251* (2013.01); *G09G 2360/14* (2013.01)

(58) Field of Classification Search
CPC ..... G06F 3/0412; G06F 3/042; G06F 3/0421; G09G 2360/14; G09G 2360/141; G09G 2360/142; G09G 2360/144; G09G 2360/145; G09G 2360/147; G09G 2360/148; G09G 2310/0235; G09G 3/3648; G09G 2310/0251; G09G 2300/0842; G09G 2300/0809
USPC .............. 345/87–88, 173, 175, 207
See application file for complete search history.

(56) References Cited

U.S. PATENT DOCUMENTS

| 5,731,856 | A | 3/1998 | Kim et al. |
| 5,744,864 | A | 4/1998 | Cillessen et al. |
| 6,243,069 | B1 | 6/2001 | Ogawa et al. |
| 6,294,274 | B1 | 9/2001 | Kawazoe et al. |
| 6,563,174 | B2 | 5/2003 | Kawasaki et al. |
| 6,727,522 | B1 | 4/2004 | Kawasaki et al. |
| 6,747,638 | B2 | 6/2004 | Yamazaki et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al |

(Continued)

FOREIGN PATENT DOCUMENTS

| EP | 0 915 367 A1 | 5/1999 |
| EP | 1 610 210 A1 | 12/2005 |

(Continued)

OTHER PUBLICATIONS

Tanaka, K. et al, "45.5: A System LCD with Optical Input Function Using Infra-Red Backlight Subtraction Scheme," SID Digest '01: SID International Symposium Digest of Technical Papers, 2010, pp. 680-683.

(Continued)

*Primary Examiner* — Matthew Fry
(74) *Attorney, Agent, or Firm* — Husch Blackwell LLP

(57) ABSTRACT

Accuracy of photodetection is improved. A method for driving an input-output device which includes a light unit, a display circuit, and Y (Y is a natural number of 2 or more) photodetectors is provided. The same photodetection control signal is input to the Y photodetectors. The light unit is lit while the Z light-emitting diodes are sequentially switched and emit light in a frame period set by the display selection signal. In a cycle that is longer than a cycle of switching the lighting states of the light unit, Y pieces of data based on the illuminance of light incident on the Y photodetectors are generated in a period during which the light unit is lit.

17 Claims, 16 Drawing Sheets

(56) References Cited

U.S. PATENT DOCUMENTS

| | | | |
|---|---|---|---|
| 7,271,835 B2 | 9/2007 | Iizuka et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,522,149 B2 | 4/2009 | Nakamura et al. | |
| 7,525,523 B2 | 4/2009 | Yamazaki et al. | |
| 7,663,165 B2 | 2/2010 | Mouli | |
| 7,674,650 B2 | 3/2010 | Akimoto et al. | |
| 7,732,819 B2 | 6/2010 | Akimoto et al. | |
| 7,868,326 B2* | 1/2011 | Sano et al. | 257/58 |
| 8,400,428 B2 | 3/2013 | Kurokawa et al. | |
| 8,665,223 B2 | 3/2014 | Harada et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0071147 A1* | 4/2006 | Dai | 250/208.1 |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0157760 A1 | 7/2006 | Hayashi et al. | |
| 2006/0169973 A1 | 8/2006 | Isa et al. | |
| 2006/0170111 A1 | 8/2006 | Isa et al. | |
| 2006/0187183 A1* | 8/2006 | Naka et al. | 345/102 |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0018075 A1 | 1/2007 | Cazaux et al. | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0054319 A1 | 3/2008 | Mouli | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0101948 A1 | 4/2009 | Park et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2009/0295769 A1 | 12/2009 | Yamazaki et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0117991 A1 | 5/2010 | Koyama et al. | |
| 2010/0134443 A1* | 6/2010 | Nakamura | 345/175 |
| 2010/0156850 A1* | 6/2010 | Kurokawa | G02F 1/13338 345/175 |
| 2010/0182282 A1 | 7/2010 | Kurokawa et al. | |
| 2010/0220077 A1* | 9/2010 | Fukunaga | G06F 3/0412 345/175 |
| 2010/0238135 A1* | 9/2010 | Brown et al. | 345/175 |
| 2010/0238334 A1* | 9/2010 | Takahashi | 348/305 |
| 2011/0141151 A1* | 6/2011 | Fujioka | G06F 1/3203 345/690 |

FOREIGN PATENT DOCUMENTS

| | | |
|---|---|---|
| EP | 1 737 044 A1 | 12/2006 |
| EP | 2 226 847 A2 | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-006991 A | 1/1999 |
| JP | 11-8741 | 1/1999 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2004-318819 A | 11/2004 |
| JP | 2006-276223 A | 10/2006 |
| JP | 2007-65239 | 3/2007 |
| JP | 2009-063803 A | 3/2009 |
| JP | 2009-134066 A | 6/2009 |
| JP | 2009-187342 | 8/2009 |
| JP | 2009-187342 A | 8/2009 |
| JP | 2010-108489 A | 5/2010 |
| WO | WO 2004/114391 A1 | 12/2004 |

OTHER PUBLICATIONS

Jeon, S. et al, "180nm Gate Length Amorphous InGaZnO Thin Film Transistor for High Density Image Sensor Applications," IEDM 10: Technical Digest of International Electron Devices Meeting, Dec. 6, 2010, pp. 504-507.

(56) References Cited

OTHER PUBLICATIONS

Tanaka, K. et al, "45.5: A System LCD with Optical Input Function Using Infra-Red Backlight Subtraction Scheme," SID Digest '10: SID International Symposium Digest of Technical Papers, 2010, pp. 680-683.

Asakuma, N. et al., "Crystallization and Reduction of Sol-Gel-Derived Zinc Oxide Films by Irradiation with Ultraviolet Lamp," Journal of Sol0Gel Science and Technology, 2003, vol. 26, pp. 181-184.

Asaoka, Y. et al., "29.1:Polarizer-Free Reflective LCD Combined With Ultra Low-Power Driving Technology," SID Digest '09: SID International Symposium Digest of Technical Papers, May 31, 2009, pp. 395-398.

Chern, H. et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D. et al., "21.2:AL and SN-Doped Zinc Indium Oxide Thin Film Transistors for AMOLED Back-Plane," SID Digest '09: SID International Symposium Digest of Technical Papers, May 31, 2009, pp. 280-283.

Clark, S. et al., "First Principles Methods Using Castep," Zeitschrift fur Kristallographie, 2005, vol. 220, pp. 567-570.

Coates, D. et al., "Optical Studies of the Amorphous Liquid-Cholesteric Liquid Crystal Transition: The "Blue Phase,"" Physics Letters, Sep. 10, 1973, vol. 45A, No. 2, pp. 115-116.

Costello, M. et al., "Electron Microscopy of a Cholesteric Liquid Crystal and Its Blue Phase," Physical Review. A, May 1, 1984, vol. 29, No. 5, pp. 2957-2959.

Dembo, H. et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E. et al., "Wide-Bandgap High-Mobility ZnOThin-Film Transistors Produced at Room Temperature," Applied Physics Letters, Sep. 27, 2004, vol. 85, No. 13, pp. 2541-2543.

Fung, T. et al., "2-D Numerical Simulation of High Performance Amorphous In-Ga-Zn-O TFTs for Flat Panel Displays," AM-FPD '08 Digest of Technical Papers, Jul. 2, 2008, pp. 251-252, The Japan Society of Applied Physics.

Godo, H. et al., "P-9:Numerical Analysis on Temperature Dependence of Characteristics of Amorphous In-Ga-Zn-Oxide TFT," SID Digest '09: SID International Symposium Digest of Technical Papers, May 31, 2009, pp. 1110-1112.

Godo, H. et al., "Temperature Dependence of Characteristics and Electronic Structure for Amprphous In-Ga-Zn-Oxide TFT," AM-FPD '09 Digest of Technical Papers, Jul. 1, 2009, pp. 41-44.

Hayashi, R. et al., "42.1: Invited Paper: Improved Amorphous In-Ga-Zn-O Tfts," SID Digest '08: SID International Symposium Digest of Technical Papers, May 20, 2008, vol. 39, pp. 621-624.

Hirao, T. et al., "Novel Top-Gate Zinc Oxide Thin-Film Transistors (ZnO TFTs) for AMLCDs," Journal of the Society for Information Display, 2007, vol. 15, No. 1, pp. 17-22.

Hosono, H. et al., "Working Hypothesis to Explore Novel Wide Band Gap Electrically Conducting Amorphous Oxides and Examples," Journal of Non-Crystalline Solids, 1996, vol. 198-200, pp. 165-169.

Hosono, H., "68.3: Invited Paper:Transparent Amorphous Oxide Semiconductors for High Performance TFT," SID Digest '07: SID International Symposium Digest of Technical Papers, 2007, vol. 38, pp. 1830-1833.

Hsieh, H. et al., "P-29: Modeling of Amorphous Oxide Semiconductor Thin Film Transistors and Subgap Density of States," SID Digest '08: SID International Symposium Digest of Technical Papers, May 20, 2008, vol. 39, pp. 1277-1280.

Ikeda, T. et al., "Full-Functional System Liquid Crystal Display Using CG-Silicon Technology," SID Digest '04: SID International Symposium Digest of Technical Papers, 2004, vol. 35, pp. 860-863.

Janotti, A. et al., "Native Point Defects in ZnO," Physical Review. B, Oct. 4, 2007, vol. 76, No. 16, pp. 165202-1-165202-22.

Janotti, A. et al., "Oxygen Vacancies in ZnO," Applied Physics Letters, 2005, vol. 87, pp. 122102-1-122102-3.

Jeong, J. et al., "3.1: Distinguished Paper: 12.1-Inch WXGA AMOLED Display Driven by Indium-Gallium-Zinc-Oxide TFTs Array," SID Digest '08: SID International Symposium Digest of Technical Papers, May 20, 2008, vol. 39, No. 1, pp. 1-4.

Jin, D. et al., "65.2: Distinguished Paper:World-Largest (6.5') Flexible Full Color Top Emission AMOLED Display on Plastic Film and its Bending Properties," SID Digest '09: SID International Symposium Digest of Technical Papers, May 31, 2009, pp. 983-985.

Kanno, H. et al., "White Stacked Electrophosphorecent Organic Light-Emitting Devices Employing MOO3 as a Charge-Generation Layer," Advanced Materials, 2006, vol. 18, No. 3, pp. 339-342.

Kikuchi, H. et al., "39.1: Invited Paper:Optically Isotropic Nano-Structured Liquid Crystal Composites for Display Applications," SID Digest '09: SID International Symposium Digest of Technical Papers, May 31, 2009, pp. 578-581.

Kikuchi, H. et al., "62.2: Invited Paper:Fast Electro-Optical Switching in Polymer-Stabilized Liquid Crystalline BLue Phases for Display Application," SID Digest '07: SID International Symposium Digest of Technical Papers, 2007, vol. 38, pp. 1737-1740.

Kikuchi, H. et al., "Polymer-Stabilized Liquid Crystal Blue Phases," Nature Materials, Sep. 2, 2002, vol. 1, pp. 64-68.

Kim, S. et al., "High-Performance Oxide Thin Film Transistors Passivated by Various Gas Plasmas," 214th ECS Meeting, 2008, No. 2317, ECS.

Kimizuka, N. et al., "Spinel,YBFE2O4, and YB2FE3O7 Types of Structures for Compounds in the IN2O3 and SC2O3-A2O3-BO Systems [A; FE, GA, or AL; B: MG, MN, FE, NI, CU,or ZN] at Temperatures over 1000°C," Journal of Solid State Chemistry, 1985, vol. 60, pp. 382-384.

Kimizuka, N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System," Journal of Solid State Chemistry, Apr. 1, 1995, vol. 116, No. 1, pp. 170-178.

Kitzerow, H. et al., "Observation of Blue Phases in Chiral Networks," Liquid Crystals, 1993, vol. 14, No. 3, pp. 911-916.

Kurokawa, Y. et al., "UHF RFCPUS on Flexible and Glass Substrates for Secure RFID Systems," Journal of Solid-State Circuits, 2008, vol. 43, No. 1, pp. 292-299.

Lany, S. et al., "Dopability, Intrinsic Conductivity, and Nonstoichiometry of Transparent Conducting Oxides," Physica; Review Letters, Jan. 26, 2007, vol. 98, pp. 045501-1-015501-4.

Lee, H. et al., "Current Status of, Challenges to, and Perspective View of AM-OLED," IDW '06: Proceedings of the 13th International Display Workshops, Dec. 7, 2006, pp. 663-666.

Lee, J. et al., "World'S Largest (15-Inch) XGA AMLCD Panel Using IGZO Oxide TFT," SID Digest '08: SID International Symposium Digest of Technical Papers, May 20, 2008, vol. 39, pp. 625-628.

Lee, M. et al., "15.4: Excellent Performance of Indium-Oxide-Based Thin-Film Transistors by DC Sputtering," SID Digest '09: SID International Symposium Digest of Technical Papers, May 31, 2009, pp. 191-193.

Li, C. et al., "Modulated Structures of Homologous Compounds InMO3(ZnO)m (M=in,Ga; m=Integer) Described by Four-Dimensional Superspace Group," Journal of Solid State Chemistry, 1998, vol. 139, pp. 347-355.

Masuda, S. et al., "Transparent Thin Film Transistors Using ZnO as an Active Channel Layer and Their Electrical Properties," Journal of Applied Physics, Feb. 1, 2003, vol. 93, No. 2, pp. 1624-1630.

Meiboom, S. et al., "Theory of the Blue Phase of Cholesteric Liquid Crystals," Physical Review Letters, May 4, 1981, vol. 46, No. 18, pp. 1216-1219.

Miyasaka, M., "Suftla Flexible Microelectronics on Their Way to Business," SID Digest '07: SID International Symposium Digest of Technical Papers, 2007, vol. 38, pp. 1673-1676.

Mo, Y. et al., "Amorphous Oxide TFT Backplanes for Large Size AMOLED Displays," IDW '08: Proceedings of the 6th International Display Workshops, Dec. 3, 2008, pp. 581-584.

Nakamura, M. et al., "The Phase Relations in the In2O3-Ga2ZnO4-ZnO System at 1350°C," Journal of Solid State Chemistry, Aug. 1, 1991, vol. 93, No. 2, pp. 298-315.

(56) References Cited

OTHER PUBLICATIONS

Nakamura, M., "Synthesis of Homologous Compound with New Long-Period Structure," NIRIM Newsletter, Mar. 1, 1995, vol. 150, pp. 1-4.

Nomura, K. et al., "Amorphous Oxide Semiconductors for High-Performance Flexible Thin-Film Transistors," Japanese Journal of Applied Physics, 2006, vol. 45, No. 5B, pp. 4303-4308.

Nomura, K. et al., "Carrier Transport in Transparent Oxide Semiconductor with Intrinsic Structural Randomness Probed using Single-Crystalline InGaO3(ZnO)5 Films," Applied Physics Letters, Sep. 13, 2004, vol. 85, No. 11, pp. 1993-1995.

Nomura, K. et al., "Room-Temperature Fabrication of Transparent Flexible Thin-Film Transistors Using Amorphous Oxide Semiconductors," Nature, Nov. 25, 2004, vol. 432, pp. 488-492.

Nomura, K. et al., "Thin-Film Transistor Fabricated in Single-Crystalline Transparent Oxide Semiconductor," Science, May 23, 2003, vol. 300, No. 5623, pp. 1269-1272.

Nowatari, H. et al., "60.2: Intermediate Connector With Suppressed Voltage Loss for White Tandem OLEDs," SID Digest '09: SID International Symposium Digest of Technical Papers, May 31, 2009, vol. 40, pp. 899-902.

Oba, F. et al., "Defect Energetics in ZnO: A Hybrid Hartree-Fock Density Functional Study," Physical Review. B, 2008, vol. 77, pp. 245202-1-245202-6.

Oh, M. et al., "Improving the Gate Stability of ZnO Thin-Film Transistors With Aluminum Oxide Dielectric Layers," Journal of the Electrochemical Society, 2008, vol. 155, No. 12, pp. H1009-H1014.

Ohara, H. et al., "21.3:4.0 in. QVGA AMOLED Display Using In-Ga-Zn-Oxide TFTs With a Novel Passivation Layer," SID Digest '09: SID International Symposium Digest of Technical Papers, May 31, 2009, pp. 284-287.

Ohara, H. et al., "Amorphous In-Ga-Zn-Oxide TFTs with Suppressed Variation for 4.0 inch QVGA AMOLED Display," AM-FPD 09 Digest of Technical Papers, Jul. 1, 2009, pp. 227-230, The Japan Society of Applied Physics.

Orita, M. et al., "Amorphous Transparent Conductive Oxide InGaO3(ZnO)m (m<4):a Zn4s Conductor," Philosophical Magazine, 2001, vol. 81, No. 5, pp. 501-515.

Orita, M. et al., "Mechanism of Electrical Conductivity of Transparent InGaZnO4," Physical Review. B, Jan. 15, 2000, vol. 61, No. 3, pp. 1811-1816.

Osada, T. et al., "15.2: Development of Driver-Integrated Panel using Amorphous In-Ga-Zn-Oxide TFT," SID Digest '09: SID International Symposium Digest of Technical Papers, May 31, 2009, pp. 184-187.

Osada, T. et al., "Development of Driver-Integrated Panel Using Amorphous In-Ga-Zn-Oxide TFT," AM-FPD '09: Digest of Technical Papers, Jul. 1, 2009, pp. 33-36.

Park, J. et al., "Amorphous Indium-Gallium-Zinc Oxide TFTs and Their Application for Large Size AMOLED," AM-FPD '08 Digest of Technical Papers, Jul. 2, 2008, pp. 275-278.

Park, J. et al., "Dry Etching of ZnO films and Plasma-Induced Damage to Optical Properties," Journal of Vacuum Science & Technology B, Mar. 1, 2003, Vol. 21, No. 2, pp. 800-803.

Park, J. et al., "Electronic Transport Properties of Amorphous Indium-Gallium-Zinc Oxide Semiconductor Upon Exposure to Water," Applied Physics Letters, 2008, vol. 92, pp. 072104-1-072104-3.

Park, J. et al., "High Performance Amorphous Oxide Thin Film Transistors with Self-Aligned Top-Gate Structure," IEDM 09: Technical Digest of International Electron Devices Meeting, Dec. 7, 2009, pp. 191-194.

Park, J. et al., "Improvements in the Device Characteristics of Amorphous Indium Gallium Zinc Oxide Thin-Film Transistors by Ar Plasma Treatment," Applied Physics Letters, Jun. 26, 2007, vol. 90, No. 26, pp. 262106-1-262106-3.

Park, S. et al., "Challenge to Future Displays: Transparent AM-OLED Driven by Peald Grown ZnO TFT," IMID '07 Digest, 2007, pp. 1249-1252.

Park, Sang-Hee et al., "42.3: Transparent ZnO Thin Film Transistor for the Application of High Aperture Radio Bottom Emission AM-OLED Display," SID Digest '08: SID International Symposium Digest of Technical Papers, May 20, 2008, vol. 39, pp. 629-632.

Prins, M. et al., "A Ferroelectric Transparent Thin-Film Transistor," Applied Physics Letters, Jun. 17, 1996, vol. 68, No. 25, pp. 3650-3652.

Sakata, J. et al., "Development of 4.0-in. AMOLED Display With Driver Circuit Using Amorphous In-Ga-Zn-Oxide TFTs," IDW '09: Proceedings of the 16th International Display Workshops, 2009, pp. 689-692.

Son, K. et al., "42.4L: Late-News Paper: 4 Inch QVGA AMOLED Driven by the Threshold Voltage Controlled Amorphous Gizo (Ga2O2-In2O3-ZnO) TFT," SID Digest '08: SID International Symposium Digest of Technical Papers, May 20, 2008, vol. 39, pp. 633-336.

Takahashi, M. et al., "Theoretical Analysis of IGZO Transparent Amorphous Oxide Semiconductor," IDW '08: Proceedings of the 15th International Display Workshops, Dec. 3, 2008, pp. 1637-1640.

Tsuda, K. et al., "Ultra Low Power Consumption Technologies for Mobile TFT-LCDs ," IDW '02: Proceedings of the 9th International Display Workshops, Dec. 4, 2002, pp. 295-298.

Ueno, K. et al., "Field-Effect Transistor on SrTiO3 With Sputtered Al2O3 Gate Insulator," Applied Physics Letters, Sep. 1, 2003, vol. 83, No. 9, pp. 1755-1757.

Van de Walle, C., "Hydrogen as a Cause of Doping in Zinc Oxide," Physical Review Letters, Jul. 31, 2000, vol. 85, No. 5, pp. 1012-1015.

\* cited by examiner

METHOD FOR DRIVING INPUT-OUTPUT DEVICE, AND INPUT-OUTPUT DEVICE

BACKGROUND OF THE INVENTION

1. Field of the Invention

One embodiment of the present invention relates to a method for driving an input-output device. Further, one embodiment of the present invention relates to an input-output device.

2. Description of the Related Art

In recent years, techniques of devices from which data is output and to which data is input by incidence of light (such devices are also referred to as input-output devices) have been developed.

As an input-output device, there is an input-output device which includes a plurality of photodetectors (also referred to as optical sensors) arranged in matrix in a pixel portion and a backlight including light-emitting diodes with a plurality of colors as light sources (for example, Reference 1). In the input-output device disclosed in Reference 1, in each frame period, the backlight is lit while the colors of emitted light are switched so that full-color images are displayed, and light reflected by an object is read as data. Thus, the input-output device disclosed in Reference 1 functions as a touch panel. Note that a method by which a backlight is lit while the colors of emitted light are switched in each frame period is also referred to as a field-sequential method.

REFERENCE

Reference 1: Japanese Published Patent Application No. 11-008741

SUMMARY OF THE INVENTION

A conventional input-output device has a problem of low accuracy of photodetection.

For example, the conventional input-output device employs a method by which data based on the illuminance of incident light (such data is also referred to as optical data) is generated in a photodetector in each row and is output (such a method is also referred to as a rolling shutter method). When the conventional input-output device employs a field-sequential method, it is necessary that a plurality of light-emitting diodes be sequentially switched and emit light in one frame period so that the lighting state of a backlight can be switched. Thus, in order to generate optical data based on the lighting state of the backlight, it is necessary that optical data be generated in the photodetector in each row so that optical data can be generated in all the photodetectors in a period during which the backlight is lit. Accordingly, the light incidence time in each photodetector at the time of generating optical data is short, so that accuracy of photodetection is reduced.

In addition, for example, light in an environment in which an input-output device is placed, such as external light, enters the input-output device. Thus, the light in the environment causes noise when optical data is generated. Accordingly, accuracy of photodetection is reduced.

An object of one embodiment of the present invention is to improve accuracy of photodetection.

One embodiment of the present invention includes a display circuit, a plurality of photodetectors, and a light unit including a plurality of light-emitting diodes. The light unit is lit while the plurality of light-emitting diodes are switched per unit time, and optical data is generated in the plurality of photodetectors in accordance with the same signal when the light unit is in at least one of the lighting states in the unit time. Thus, the light incidence time in each photodetector at the time of generating optical data is lengthened, so that accuracy of photodetection is improved.

One embodiment of the present invention is a method for driving an input-output device which includes a light unit including Z (Z is a natural number of 3 or more) light-emitting diodes; X (X is a natural number) display circuits overlapping with the light unit, supplied with a display selection signal, supplied with a display data signal in accordance with the display selection signal, and set to be in a display state based on data of the input display data signal; and Y (Y is a natural number of 2 or more) photodetectors overlapping with the light unit, supplied with a photodetection control signal, and generating data based on the illuminance of incident light in accordance with the input photodetection control signal. The same photodetection control signal is input to the Y photodetectors. The light unit is lit while the Z light-emitting diodes are sequentially switched and emit light in a frame period set by the display selection signal. In a cycle that is longer than a cycle of switching the lighting states of the light unit, Y pieces of data based on the illuminance of light incident on the Y photodetectors are generated in a period during which the light unit is lit.

One embodiment of the present invention is a method for driving an input-output device which includes a light unit including Z (Z is a natural number of 3 or more) light-emitting diodes; X (X is a natural number) display circuits overlapping with the light unit, supplied with a display selection signal, supplied with a display data signal in accordance with the display selection signal, and set to be in a display state based on data of the input display data signal; and Y (Y is a natural number of 2 or more) photodetectors overlapping with the light unit, supplied with a photodetection control signal, and generating data based on the illuminance of incident light in accordance with the input photodetection control signal. The same photodetection control signal is input to the Y photodetectors. The light unit is lit while the Z light-emitting diodes are sequentially switched and emit light in a frame period set by the display selection signal. In a cycle that is longer than a cycle of switching the lighting states of the light unit, Y pieces of first data based on the illuminance of light incident on the Y photodetectors are generated in a period during which the light unit is lit, and Y pieces of second data based on the illuminance of light incident on the Y photodetectors are generated in a period during which the light unit is not lit. Third data corresponding to difference data between the first data and the second data is generated.

One embodiment of the present invention is an input-output device which includes a light unit including Z (Z is a natural number of 3 or more) light-emitting diodes; X (X is a natural number) display circuits overlapping with the light unit, supplied with a display selection signal, supplied with a display data signal in accordance with the display selection signal, and set to be in a display state based on data of the input display data signal; Y (Y is a natural number of 2 or more) photodetectors overlapping with the light unit, supplied with the same photodetection control signal, and generating data based on the illuminance of incident light in accordance with the input photodetection control signal; a reading circuit for reading the data based on the illuminance of the incident light from the Y photodetectors; and a data processing circuit for generating difference data between two pieces of data based on the illuminance of the incident light read in the reading circuit.

According to one embodiment of the present invention, accuracy of photodetection can be improved.

DETAILED DESCRIPTION OF THE INVENTION

Examples of embodiments of the present invention will be described below with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments.

Note that the contents of the embodiments can be combined with each other as appropriate. In addition, the contents of the embodiments can be replaced with each other.

Embodiment 1

In this embodiment, an input-output device that can output data and can input data by incident light is described.

An example of the input-output device in this embodiment is described with reference to FIGS. 1A to 1C.

First, a structure example of the input-output device in this embodiment is described with reference to FIG. 1A. FIG. 1A is a schematic diagram illustrating the structure example of the input-output device in this embodiment.

Figure 1A:
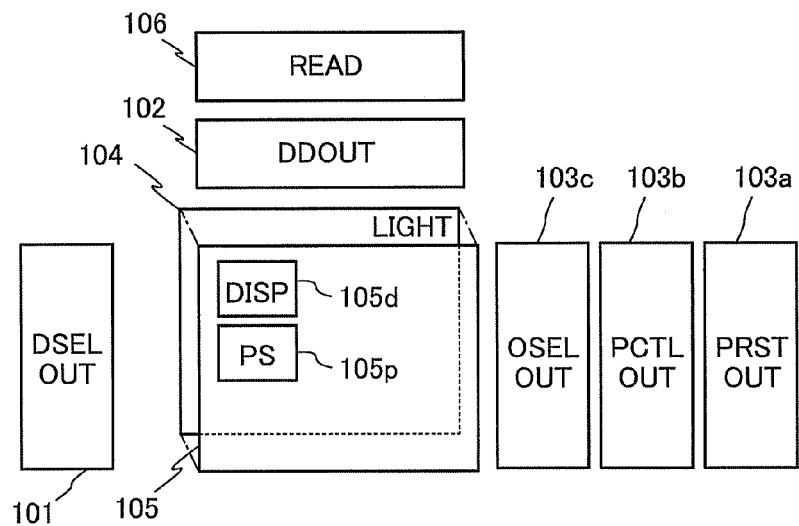
FIGS. 1A to 1C illustrate an example of an input-output device in Embodiment 1.

The input-output device illustrated in FIG. 1A includes a display selection signal output circuit (DSELOUT) 101, a display data signal output circuit (DDOUT) 102, a photodetection reset signal output circuit (PRSTOUT) 103a, a photodetection control signal output circuit (PCTLOUT) 103b, an output selection signal output circuit (OSELOUT) 103c, a light unit (LIGHT) 104, X (X is a natural number) display circuits (DISP) 105d, Y (Y is a natural number of 2 or more) photodetectors (PS) 105p, and a reading circuit (READ) 106.

The display selection signal output circuit 101 has a function of outputting a plurality of display selection signals that are pulse signals (also referred to as signals DSEL).

The display selection signal output circuit 101 includes, for example, a shift register. The display selection signal output circuit 101 can output display selection signals by output of pulse signals from the shift register.

A video signal is input to the display data signal output circuit 102. The display data signal output circuit 102 has a function of generating a display data signal (also referred to as a signal DD) that is a voltage signal on the basis of the input video signal and outputting the generated display data signal.

The display data signal output circuit 102 includes, for example, a transistor.

Note that in the input-output device, the transistor includes two terminals and a current control terminal for controlling current flowing between the two terminals by applied voltage. Note that without limitation to the transistor, terminals where current flowing therebetween is controlled are also referred to as current terminals. Two current terminals are also referred to as a first current terminal and a second current terminal.

Further, in the input-output device, a field-effect transistor can be used as the transistor, for example. In a field-effect transistor, a first current terminal, a second current terminal, and a current control terminal are one of a source and a drain, the other of the source and the drain, and a gate, respectively.

The term "voltage" generally means a difference between potentials at two points (also referred to as a potential difference). However, levels of voltage and potentials are represented by volts (V) in a circuit diagram or the like in some cases, so that it is difficult to distinguish them. Thus, in this specification, a potential difference between a potential at one point and a potential to be a reference (also referred to as a reference potential) is used as voltage at the point in some cases unless otherwise specified.

The display data signal output circuit 102 can output data of a video signal as a display data signal when the transistor is on. The transistor can be controlled by input of a control signal that is a pulse signal to the current control terminal. Note that in the case where the number of the display circuits 105d is plural, a plurality of transistors may be selectively turned on or off so that data of video signals is output as a plurality of display data signals.

The photodetection reset signal output circuit 103a has a function of outputting photodetection reset signals that are pulse signals (also referred to as signals PRST).

The photodetection reset signal output circuit 103a includes, for example, a shift register. The photodetection reset signal output circuit 103a can output photodetection reset signals by output of pulse signals from the shift register.

The photodetection control signal output circuit 103b has a function of outputting photodetection control signals that are pulse signals (also referred to as signals PCTL).

The photodetection control signal output circuit 103b includes, for example, a shift register. The photodetection control signal output circuit 103b can output photodetection control signals by output of pulse signals from the shift register.

The output selection signal output circuit 103c has a function of outputting output selection signals that are pulse signals (also referred to as signals OSEL).

The output selection signal output circuit 103c includes, for example, a shift register. The output selection signal output circuit 103c can output selection signals by output of pulse signals from the shift register.

The light unit 104 is a light-emitting unit including a light source.

The light unit 104 includes Z (Z is a natural number of 3 or more) light-emitting diodes (also referred to as LEDs) as light sources. The Z light-emitting diodes are light-emitting diodes that emit light with a wavelength in a visible light range (e.g., a wavelength of 360 to 830 nm). For example, a red light-emitting diode, a green light-emitting diode, and a blue light-emitting diode can be used as the Z light-emitting diodes. Note that the number of the light-emitting diodes of each color may be plural. Further, in addition to the red, green, and blue light-emitting diodes, a light-emitting diode of a different color (e.g., a white light-emitting diode) may be used as the Z light-emitting diodes.

Note that, for example, light emission of the light-emitting diodes may be controlled with a control signal used for selecting the light-emitting diode to which voltage is applied. In addition, an optical control circuit for outputting a control signal used for controlling whether the light-emitting diode to which voltage is applied is selected may be provided in the light unit 104.

The display circuit 105d overlaps with the light unit 104. To the display circuit 105d, a display selection signal that is a pulse signal is input, and a display data signal is input in accordance with the input display selection signal. The display circuit 105d changes its display state in accordance with data of the input display data signal.

The display circuit 105d includes, for example, a display selection transistor and a display element.

The display selection transistor has a function of selecting whether to input data of a display data signal to the display element.

The display element changes its display state in accordance with data of a display data signal by input of the data of the display data signal by the display selection transistor.

As the display element, a liquid crystal element or the like can be used, for example.

As a display mode of the input-output device including a liquid crystal element, a TN (twisted nematic) mode, an IPS (in-plane-switching) mode, an STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, a FFS (fringe field switching) mode, or the like may be used.

The photodetector 105p overlaps with the light unit 104. A photodetection reset signal, a photodetection control signal, and an output selection signal are input to the photodetector 105p.

The photodetector 105p is set to be in a reset state in accordance with a photodetection reset signal.

In addition, the photodetector 105p has a function of generating data that is voltage based on the illuminance of incident light (such data is also referred to as optical data) in accordance with a photodetection control signal. Note that the same photodetection control signal is input to the Y photodetectors 105p.

Further, the photodetector 105p has a function of outputting the generated optical data as an optical data signal in accordance with an output selection signal.

The photodetector 105p includes, for example, a photoelectric conversion element (PCE), a photodetection reset selection transistor, a photodetection control transistor, an amplifier transistor, and an output selection transistor.

The photoelectric conversion element is supplied with current (also referred to as photocurrent) in accordance with the illuminance of incident light by incidence of the light on the photoelectric conversion element.

A photodetection reset signal is input to a current control terminal of the photodetection reset selection transistor. The photodetection reset selection transistor has a function of selecting whether to set the voltage of a current control terminal of the amplifier transistor to reference voltage.

A photodetection control signal is input to a current control terminal of the photodetection control transistor. The photodetection control transistor has a function of selecting whether to set the voltage of the current control terminal of the amplifier transistor to voltage based on photocurrent flowing to the photoelectric conversion element.

An output selection signal is input to a current control terminal of the output selection transistor. The output selection transistor has a function of selecting whether to output optical data as an optical data signal from the photodetector 105p.

Note that the photodetector 105p outputs optical data as an optical data signal from a first current terminal or a second current terminal of the amplifier transistor.

Note that the display circuit 105d and the photodetector 105p are provided in a pixel portion 105. The pixel portion 105 is a region where data is displayed and read. A pixel includes at least one display circuit 105d. In addition, the pixel may include at least one photodetector 105p. In the case where the number of the display circuits 105d is plural, the display circuits 105d may be arranged in matrix in the pixel portion 105. Further, in the case where the number of the photodetectors 105p is plural, the photodetectors 105p may be arranged in matrix in the pixel portion 105.

The reading circuit 106 has a function of selecting the photodetector 105p for reading optical data and reading the optical data from the selected photodetector 105p.

The reading circuit 106 includes, for example, a selector circuit. For example, the selector circuit includes a transistor. The selector circuit can read optical data by input of an optical data signal from the photodetector 105p with the transistor.

Next, as an example of a method for driving the input-output device in this embodiment, an example of a method for driving the input-output device illustrated in FIG. 1A is described with reference to FIGS. 1B and 1C. FIGS. 1B and 1C are timing charts for illustrating the example of a method for driving the input-output device illustrated in FIG. 1A.

In the example of a method for driving the input-output device illustrated in FIG. 1A, the same photodetection control signal is input to the Y photodetectors 105p. In each of a plurality of frame periods set in accordance with display selection signals (e.g., frame periods f1 to fn illustrated in FIGS. 1B and 1C), a first light-emitting diode to a Z-th light-emitting diode provided in the light unit 104 are sequentially switched and emit light. Thus, as illustrated in FIGS. 1B and 1C, the lighting state of the light unit 104 is sequentially switched from a lighting state C1 (a state in which the first light-emitting diode emits light) to a lighting state Ck (a state in which the Z-th light-emitting diode emits light).

In addition, when a display data signal is input to the display circuit 105d in accordance with the display selection signal and the light unit 104 is lit, the display circuit 105d is set to be in a display state based on data of the display data signal. For example, the display state of the display circuit 105d is a display state dc1 (a display state based on the lighting state C1) when the light unit 104 is in the lighting state C1; the display state of the display circuit 105d is a display state dc2 (a display state based on the lighting state C2) when the light unit 104 is in the lighting state C2; and the display state of the display circuit 105d is a display state dck (a display state based on the lighting state Ck) when the light unit 104 is in the lighting state Ck.

When the light unit 104 is lit with any of the colors, a pulse (pls) of a photodetection control signal is input to the Y photodetectors 105p. At this time, the Y photodetectors 105p generate optical data. Note that the cycle of the pulse of the photodetection control signal is made longer than the cycle of switching the lighting states of the light unit 104.

In addition, the Y photodetectors 105p output the generated optical data as optical data signals to the reading circuit 106 in accordance with output selection signals so that the optical data is read in the reading circuit 106.

Note that the colors of light at the time when the light unit 104 is lit while the pulse of the photodetection control signal is input may be the same or different from each other. In the case where the colors of light at the time when the light unit 104 is lit while the pulse of the photodetection control signal is input are the same, for example, colors based on objects are preferably selected.

Figure 1B:
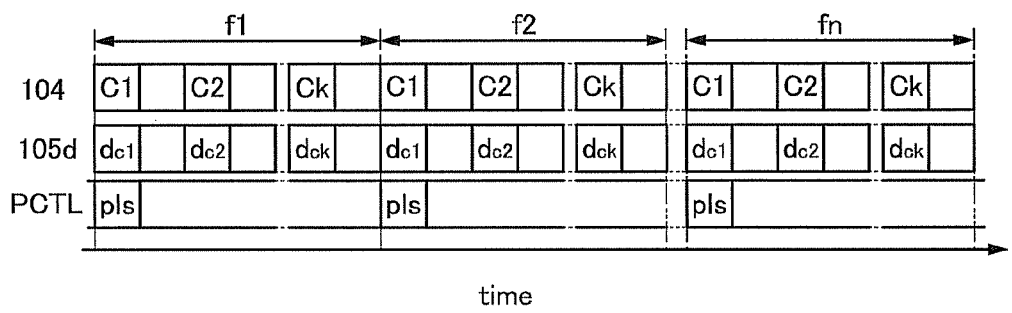

For example, in the timing chart illustrated in FIG. 1B, in a plurality of frame periods, pulses of photodetection control signals are input to the Y photodetectors 105p in the case where the colors of light at the time when the light unit 104 is lit are the same. At this time, optical data is generated in the photodetectors 105p.

Figure 1C:
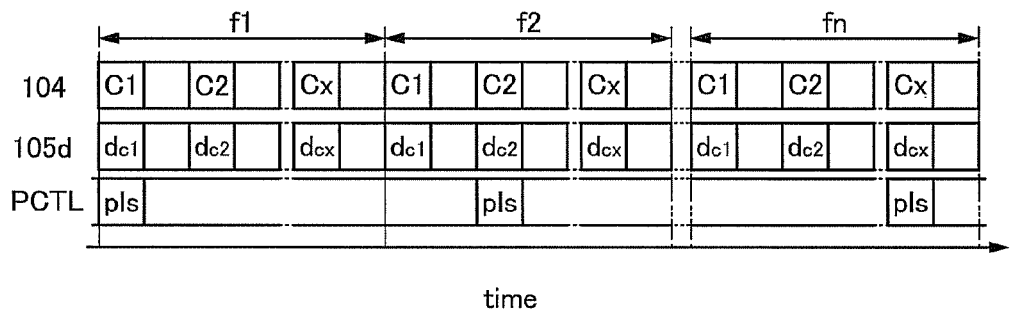

For example, in the timing chart illustrated in FIG. 1C, in a plurality of frame periods, optical data is generated in the photodetectors 105p in the case where the colors of light at the time when the light unit 104 is lit are different from each other. When the optical data is generated in the photodetectors 105p in the case where the colors of light at the time when the light unit 104 is lit are different from each other, for example, images of objects can be read as full-color images.

As described with reference to FIGS. 1A to 1C, the example of the input-output device in this embodiment includes the display circuit, the plurality of photodetectors, and the light unit. The light unit includes the Z light-emitting diodes.

In addition, the example of the input-output device in this embodiment has a structure in which the same photodetection control signal is input to the plurality of photodetectors. With such a structure, time required for all the photodetectors to generate optical data can be shortened, and the light incidence time in each photodetector at the time of generating optical data can be lengthened. Note that a method by which the same photodetection control signal is input to a plurality of photodetectors is also referred to as a global shutter method.

Further, the example of the input-output device in this embodiment has a structure in which the light unit is lit while the plurality of light-emitting diodes are sequentially switched and emit light in a frame period. With such a structure, the input-output device can display full-color images.

Furthermore, the example of the input-output device in this embodiment can have a structure in which the same photodetection control signal is input to the Y photodetectors so that in a cycle that is longer than the cycle of switching the lighting states of the light unit, Y pieces of data based on the illuminance of light incident on the Y photodetectors are generated in a period during which the light unit is lit. With such a structure, for example, a period during which optical data is not output can be provided when the light unit is lit, so that a period during which the light unit is lit can be efficiently utilized when optical data is generated. Thus, the light incidence time in each photodetector at the time of generating optical data can be lengthened. Further, optical data can be output regardless of the lighting state of the light unit; thus, the operating frequency of the photodetector can be lowered and power consumption can be reduced.

Thus, with the structures, accuracy of photodetection can be improved.

Embodiment 2

In this embodiment, a different example of the input-output device in Embodiment 1 is described. Note that the description in Embodiment is used as appropriate for portions that are the same as those in Embodiment 1.

Figure 2A:
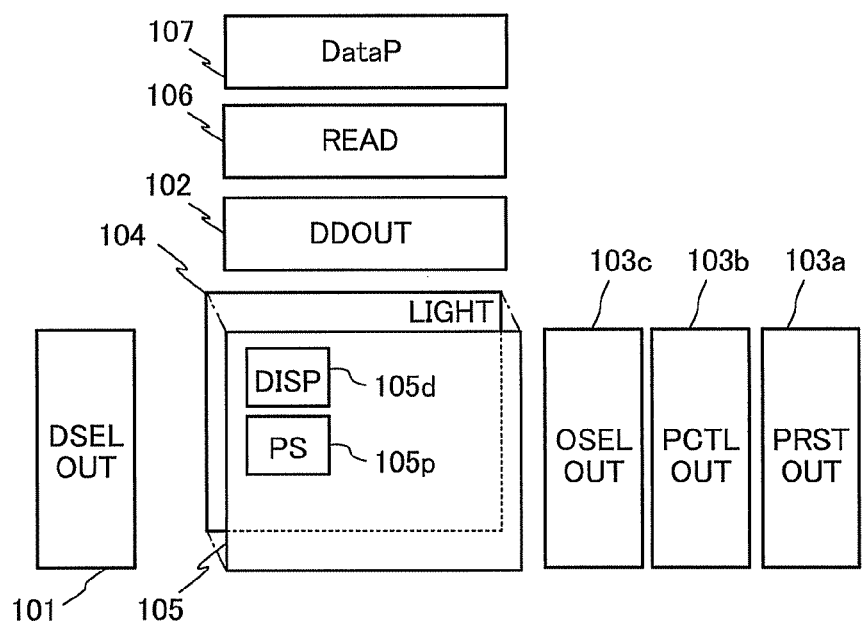
FIGS. 2A and 2B illustrate an example of an input-output device in Embodiment 2.
Figure 2B:
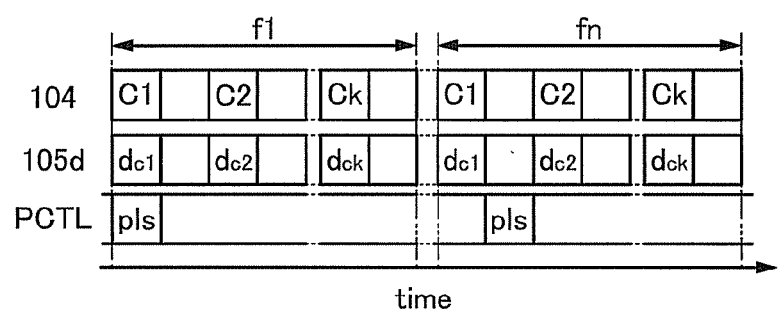

An example of the input-output device in this embodiment is described with reference to FIGS. 2A and 2B. FIGS. 2A and 2B illustrate the example of the input-output device in this embodiment.

First, a structure example of the input-output device in this embodiment is described with reference to FIG. 2A. FIG. 2A is a schematic diagram illustrating the structure example of the input-output device in this embodiment.

The input-output device illustrated in FIG. 2A includes the display selection signal output circuit 101, the display data signal output circuit 102, the photodetection reset signal output circuit 103a, the photodetection control signal output circuit 103b, the output selection signal output circuit 103c, the light unit 104, the X display circuits 105d, the Y photodetectors 105p, the reading circuit 106, and a data processing circuit (DataP) 107.

Since the display selection signal output circuit 101, the display data signal output circuit 102, the photodetection reset signal output circuit 103a, the photodetection control signal output circuit 103b, the output selection signal output circuit 103c, the light unit 104, the display circuit 105d, the photodetector 105p, and the reading circuit 106 are the same as those in the input-output device illustrated in FIG. 1A, the description of each component in the input-output device illustrated in FIG. 1A is used as appropriate.

The data processing circuit 107 is a circuit which performs arithmetic processing on data of an input data signal. The data processing circuit 107 includes a memory circuit and an arithmetic circuit. The memory circuit has a function of storing data of a data signal. The arithmetic circuit has a function of generating difference data between data of a plurality of data signals by arithmetic processing.

Note that the data processing circuit 107 may be included in the input-output device. Alternatively, the input-output device may be electrically connected to a separate data processing means (e.g., a personal computer) having a function equivalent to the function of the data processing circuit. When the data processing circuit 107 is provided in the input-output device, the number of wirings in a portion where the data processing circuit 107 and the reading circuit 106 are connected to each other can be reduced, for example.

Next, as an example of a method for driving the input-output device in this embodiment, an example of a method for driving the input-output device illustrated in FIG. 2A is described with reference to FIG. 2B. FIG. 2B is a timing chart for illustrating the example of a method for driving the input-output device illustrated in FIG. 2A.

In the example of a method for driving the input-output device illustrated in FIG. 2A, the same photodetection control signal is input to the Y photodetectors 105p. In frame periods set in accordance with display selection signals (e.g., the frame periods f1 to fn illustrated in FIG. 2B), a first light-emitting diode to a Z-th light-emitting diode provided in the light unit 104 are sequentially switched and emit light. Thus, as illustrated in FIG. 2B, the lighting state of the light unit 104 is sequentially switched from the lighting state C1 (the state in which the first light-emitting diode emits light) to the lighting state Ck (the state in which the Z-th light-emitting diode emits light). In addition, the light unit 104 is not lit between the lighting states.

In addition, when a display data signal is input to the display circuit 105d in accordance with the display selection signal and the light unit 104 is lit, the display circuit 105d is set to be in a display state based on data of the display data signal. For example, the display state of the display circuit 105d is the display state dc1 (the display state based on the lighting state C1) when the light unit 104 is in the lighting state C1; the display state of the display circuit 105d is the display state dc2 (the display state based on the lighting state C2) when the light unit 104 is in the lighting state C2; and the display state of the display circuit 105d is the display state dck (the display state based on the lighting state Ck) when the light unit 104 is in the lighting state Ck.

In a certain frame period (the frame period f1 in FIG. 2B), when the light unit 104 is lit with any of the colors, the pulse of a photodetection control signal is input to the Y photodetectors 105p. At this time, the Y photodetectors 105p generate optical data.

In addition, the Y photodetectors 105p output the generated optical data as optical data signals to the reading circuit 106 in accordance with output selection signals so that the optical data is read in the reading circuit 106. The read optical data is stored in the memory circuit included in the data processing circuit 107.

Note that the colors of light at the time when the light unit 104 supplied with the pulse of the photodetection control signal is lit may be the same or different from each other.

In a frame period that is different from the frame period, when the light unit 104 is not lit, the pulse of a photodetection control signal is input to the Y photodetectors 105p. At this time, the Y photodetectors 105p generate optical data.

In addition, the Y photodetectors 105p output the generated optical data as optical data signals to the reading circuit 106 in accordance with output selection signals so that the optical data is read in the reading circuit 106. The read optical data is stored in the memory circuit included in the data processing circuit 107.

Further, the arithmetic circuit included in the data processing circuit 107 generates difference data between optical data obtained at the time when the light unit 104 is lit and optical data obtained at the time when the light unit 104 is not lit. The difference data is used as data for executing predetermined processing.

Note that the difference data may be generated after optical data at the time when the light unit 104 is lit with a plurality of colors is generated and full-color optical data is generated from the optical data.

As described with reference to FIGS. 2A and 2B, in the example of the input-output device in this embodiment, optical data at the time when the light unit is lit and optical data at the time when the light unit is not lit are generated and difference data between two optical data signals is generated, in addition to the structure described in Embodiment 1. By generation of such difference data, in addition to the advantages described in Embodiment 1, data of light in an environment in which the input-output device is placed can be eliminated from optical data. Thus, the accuracy of photodetection can be further improved.

Embodiment 3

In this embodiment, examples of the photodetector in the input-output device in the above embodiment are described.

Examples of the photodetector in this embodiment are described with reference to FIGS. 3A to 3D. FIGS. 3A to 3D illustrate the examples of the photodetector in this embodiment.

Figure 3A:
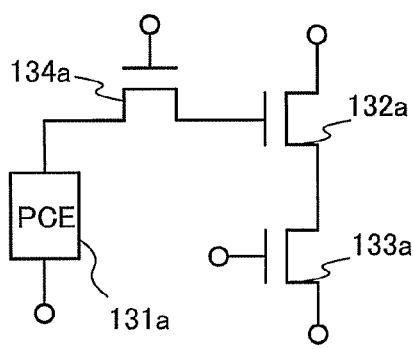
FIGS. 3A to 3D illustrate examples of photodetectors in Embodiment 3.
Figure 3C:
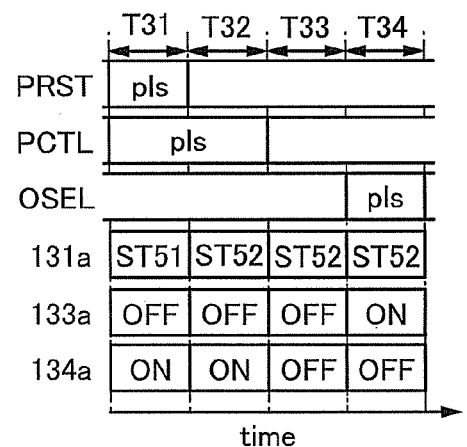
Figure 3B:
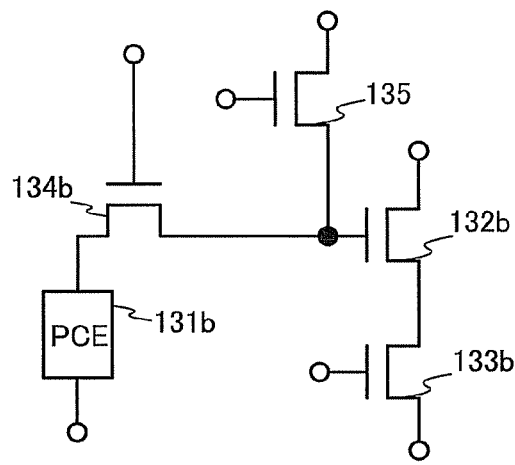

First, structure examples of the photodetector in this embodiment are described with reference to FIGS. 3A and 3B. FIGS. 3A and 3B illustrate the structure examples of the photodetector in this embodiment.

The photodetector illustrated in FIG. 3A includes a photoelectric conversion element 131a, a transistor 132a, a transistor 133a, and a transistor 134a.

Note that in the photodetector illustrated in FIG. 3A, the transistor 132a, the transistor 133a, and the transistor 134a are field-effect transistors.

The photoelectric conversion element 131a has a first current terminal and a second current terminal. A reset signal is input to the first current terminal of the photoelectric conversion element 131a.

One of a source and a drain of the transistor 134a is electrically connected to the second current terminal of the photoelectric conversion element 131a. A photodetection control signal is input to a gate of the transistor 134a.

A gate of the transistor 132a is electrically connected to the other of the source and the drain of the transistor 134a.

One of a source and a drain of the transistor 133a is electrically connected to one of a source and a drain of the transistor 132a. An output selection signal is input to a gate of the transistor 133a.

Voltage $V_a$ is input to either the other of the source and the drain of the transistor 132a or the other of the source and the drain of the transistor 133a.

In addition, the photodetector illustrated in FIG. 3A outputs optical data from the rest of the other of the source and the drain of the transistor 132a or the other of the source and the drain of the transistor 133a as an optical data signal.

The photodetector illustrated in FIG. 3B includes a photoelectric conversion element 131b, a transistor 132b, a transistor 133b, a transistor 134b, and a transistor 135.

Note that in the photodetector illustrated in FIG. 3B, the transistor 132b, the transistor 133b, the transistor 134b, and the transistor 135 are field-effect transistors.

The photoelectric conversion element 131b has a first current terminal and a second current terminal. Voltage $V_b$ is input to the first current terminal of the photoelectric conversion element 131b.

Note that one of the voltage $V_a$ and the voltage $V_b$ is high power supply voltage $V_{dd}$, and the other of the voltage $V_a$ and the voltage $V_b$ is low power supply voltage $V_{ss}$. The high supply voltage $V_{dd}$ is voltage whose level is relatively higher than that of the low supply voltage $V_{ss}$. The low supply voltage $V_{ss}$ is voltage whose level is relatively lower than that of the high supply voltage $V_{dd}$. The level of the voltage $V_a$ and the level of the voltage $V_b$ might interchange depending, for example, on the polarity of the transistor. A difference between the voltage $V_a$ and the voltage $V_b$ is power supply voltage.

One of a source and a drain of the transistor 134b is electrically connected to the second current terminal of the photoelectric conversion element 131*b*. A photodetection control signal is input to a gate of the transistor 134*b*.

A gate of the transistor 132*b* is electrically connected to the other of the source and the drain of the transistor 134*b*.

A photodetection reset signal is input to a gate of the transistor 135. The voltage $V_a$ is input to one of a source and a drain of the transistor 135. The other of the source and the drain of the transistor 135 is electrically connected to the other of the source and the drain of the transistor 134*b*.

An output selection signal is input to a gate of the transistor 133*b*. One of a source and a drain of the transistor 133*b* is electrically connected to one of a source and a drain of the transistor 132*b*.

The voltage $V_a$ is input to either the other of the source and the drain of the transistor 132*b* or the other of the source and the drain of the transistor 133*b*.

In addition, the photodetector illustrated in FIG. 3B outputs optical data from the rest of the other of the source and the drain of the transistor 132*b* or the other of the source and the drain of the transistor 133*b* as an optical data signal.

Further, the components of the photodetectors illustrated in FIGS. 3A and 3B are described.

As the photoelectric conversion elements 131*a* and 131*b*, photodiodes, phototransistors, or the like can be used. In the case where the photoelectric conversion elements 131*a* and 131*b* are photodiodes, one of an anode and a cathode of the photodiode corresponds to the first current terminal of the photoelectric conversion element, and the other of the anode and the cathode of the photodiode corresponds to the second current terminal of the photoelectric conversion element. In the case where the photoelectric conversion elements 131*a* and 131*b* are phototransistors, one of a source and a drain of the phototransistor corresponds to the first current terminal of the photoelectric conversion element, and the other of the source and the drain of the phototransistor corresponds to the second current terminal of the photoelectric conversion element.

The transistors 132*a* and 132*b* function as amplifier transistors.

The transistors 134*a* and 134*b* function as photodetection control transistors.

The transistor 135 functions as a photodetection reset selection transistor.

The transistors 133*a* and 133*b* function as output selection transistors.

Note that as each of the transistors 132*a*, 132*b*, 133*a*, 133*b*, 134*a*, 134*b*, and 135, for example, it is possible to use a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors. For example, with the use of the transistor including the oxide semiconductor layer, fluctuation in gate voltage due to the leakage current of each of the transistors 132*a*, 132*b*, 133*a*, 133*b*, 134*a*, 134*b*, and 135 can be suppressed.

Next, examples of methods for driving the photodetectors illustrated in FIGS. 3A and 3B are described.

First, the example of the method for driving the photodetector illustrated in FIG. 3A is described with reference to FIG. 3C. FIG. 3C is a timing chart for illustrating the example of the method for driving the photodetector illustrated in FIG. 3A, which illustrates states of the photodetection reset signal, the output selection signal, the photoelectric conversion element 131*a*, the transistor 133*a*, and the transistor 134*a*. Note that the case where the photoelectric conversion element 131*a* is a photodiode is described as an example here.

In the example of the method for driving the photodetector illustrated in FIG. 3A, first, in a period T31, the pulse of a photodetection reset signal is input. In the period T31 and a period T32, the pulse of a photodetection control signal is input. Note that in the period T31, timing of starting input of the pulse of the photodetection reset signal may be earlier than timing of starting input of the pulse of the photodetection control signal.

In that case, in the period T31, the photoelectric conversion element 131*a* is in a state in which current flows in a forward direction (also referred to as a state ST51), the transistor 134*a* is turned on, and the transistor 133*a* is turned off.

At this time, the voltage of the gate of the transistor 132*a* is reset to a certain level.

Then, in the period T32 after the input of the pulse of the photodetection reset signal, the photoelectric conversion element 131*a* is set to be in a state in which voltage is applied in a reverse direction (also referred to as a state ST52), and the transistor 133*a* is kept off.

At this time, photocurrent flows between the first current terminal and the second current terminal of the photoelectric conversion element 131*a* in accordance with the illuminance of light incident on the photoelectric conversion element 131*a*. Further, the voltage level of the gate of the transistor 132*a* is changed in accordance with the photocurrent. In that case, channel resistance between the source and the drain of the transistor 132*a* is changed.

Further, in a period T33 after the input of the pulse of the photodetection control signal, the transistor 134*a* is turned off.

At this time, the voltage of the gate of the transistor 132*a* is kept to be a level corresponding to the photocurrent of the photoelectric conversion element 131*a* in the period T32. Note that the period T33 is not necessarily provided; however, with provision of the period T33, timing of outputting an optical data signal in the photodetector can be set as appropriate. For example, timing of outputting an optical data signal in each of the plurality of photodetectors can be set as appropriate.

Then, in a period T34, the pulse of the output selection signal is input.

At this time, the photoelectric conversion element 131*a* is kept in the state ST52, the transistor 133*a* is turned on, and current flows through the source and the drain of the transistor 132*a* and the source and the drain of the transistor 133*a*. The amount of the current flowing through the source and the drain of the transistor 132*a* and the source and the drain of the transistor 133*a* depends on the voltage level of the gate of the transistor 132*a*. Thus, optical data has a value based on the illuminance of light incident on the photoelectric conversion element 131*a*. In addition, the photodetector illustrated in FIG. 3A outputs optical data from the rest of the other of the source and the drain of the transistor 132*a* or the other of the source and the drain of the transistor 133*a* as an optical data signal. That is the example of the method for driving the photodetector illustrated in FIG. 3A.

Figure 3D:
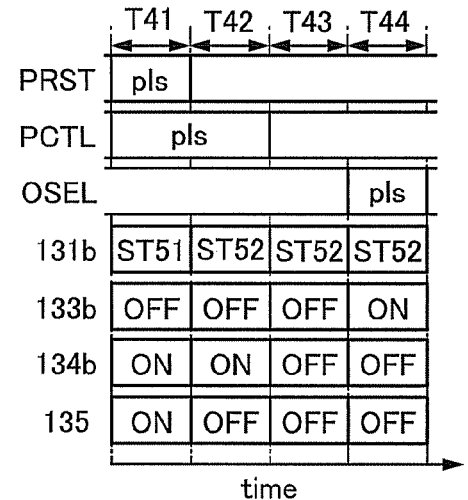

Next, the example of the method for driving the photodetector illustrated in FIG. 3B is described with reference to FIG. 3D. FIG. 3D is a timing chart for illustrating the example of the method for driving the photodetector illustrated in FIG. 3B.

In the example of the method for driving the photodetector illustrated in FIG. 3B, first, in a period T41, the pulse of a photodetection reset signal is input. In the period T41 and a period T42, the pulse of a photodetection control signal is input. Note that in the period T41, timing of starting input of the pulse of the photodetection reset signal may be earlier than timing of starting input of the pulse of the photodetection control signal.

At this time, in the period T41, the photoelectric conversion element 131b is set to be in the state ST51, and the transistor 134b is turned on, so that the voltage level of the gate of the transistor 132b is reset to a level equivalent to the level of the voltage $V_a$.

Further, in the period T42 after the input of the pulse of the photodetection reset signal, the photoelectric conversion element 131b is set to be in the state ST52, the transistor 134b is kept on, and the transistor 135 is turned off.

At this time, photocurrent flows between the first current terminal and the second current terminal of the photoelectric conversion element 131b in accordance with the illuminance of light incident on the photoelectric conversion element 131b. Further, the voltage level of the gate of the transistor 132b is changed in accordance with the photocurrent. In that case, channel resistance between the source and the drain of the transistor 132b is changed.

Further, in a period T43 after the input of the pulse of the photodetection control signal, the transistor 134b is turned off.

At this time, the voltage of the gate of the transistor 132b is kept to be a level corresponding to the photocurrent of the photoelectric conversion element 131b in the period T42. Note that the period T43 is not necessarily provided; however, with provision of the period T43, timing of outputting an optical data signal in the photodetector can be set as appropriate. For example, timing of outputting an optical data signal in each of the plurality of photodetectors can be set as appropriate.

In a period T44, the pulse of the output selection signal is input.

At this time, the photoelectric conversion element 131b is kept in the state ST52 and the transistor 133b is turned on.

When the transistor 133b is turned on, the photodetector illustrated in FIG. 3B outputs an optical data signal from the rest of the other of the source and the drain of the transistor 132b or the other of the source and the drain of the transistor 133b. The amount of current flowing through the source and the drain of the transistor 132b and the source and the drain of the transistor 133b depends on the voltage level of the gate of the transistor 132b. Thus, optical data has a value based on the illuminance of light incident on the photoelectric conversion element 131b. That is the example of the method for driving the photodetector illustrated in FIG. 3B.

As described with reference to FIGS. 3A to 3D, the example of the photodetector in this embodiment includes the photoelectric conversion element, the photodetection control transistor, and the amplifier transistor. The example of the photodetector in this embodiment has a structure in which optical data is generated in accordance with a photodetection control signal and is output as a data signal in accordance with an output selection signal. With such a structure, the photodetector can generate and output optical data.

Embodiment 4

In this embodiment, examples of the display circuit in the input-output device in the above embodiment are described.

Examples of the display circuit in this embodiment are described with reference to FIGS. 4A to 4D. FIGS. 4A to 4D illustrate the examples of the display circuit in this embodiment.

Figure 4A:
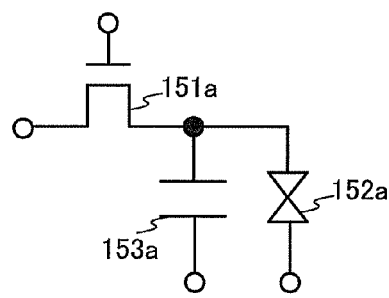
FIGS. 4A to 4D illustrate examples of display circuits in Embodiment 4.
Figure 4C:
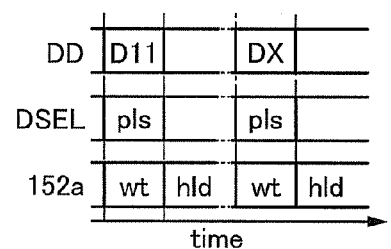
Figure 4B:
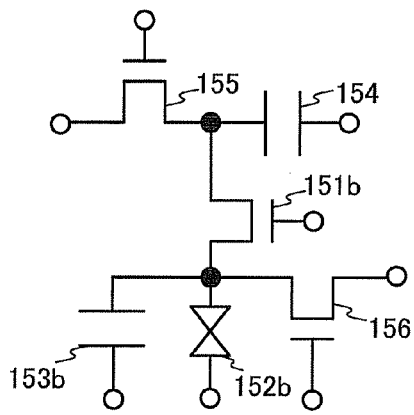

First, structure examples of the display circuit in this embodiment are described with reference to FIGS. 4A and 4B. FIGS. 4A and 4B illustrate the structure examples of the display circuit in this embodiment.

The display circuit illustrated in FIG. 4A includes a transistor 151a, a liquid crystal element 152a, and a capacitor 153a.

Note that in the display circuit illustrated in FIG. 4A, the transistor 151a is a field-effect transistor.

In addition, in the input-output device, the liquid crystal element includes a first display electrode, a second display electrode, and a liquid crystal layer. The light transmittance of the liquid crystal layer changes depending on voltage applied between the first display electrode and the second display electrode.

Further, in the input-output device, the capacitor includes a first capacitor electrode, a second capacitor electrode, and a dielectric layer overlapping with the first capacitor electrode and the second capacitor electrode. Electrical charge is accumulated in the capacitor in accordance with voltage applied between the first capacitor electrode and the second capacitor electrode.

A display data signal is input to one of a source and a drain of the transistor 151a, and a display selection signal is input to a gate of the transistor 151a.

The first display electrode of the liquid crystal element 152a is electrically connected to the other of the source and the drain of the transistor 151a. Voltage $V_c$ is input to the second display electrode of the liquid crystal element 152a. The level of the voltage $V_c$ can be set as appropriate.

The first capacitor electrode of the capacitor 153a is electrically connected to the other of the source and the drain of the transistor 151a. The voltage $V_c$ is input to the second capacitor electrode of the capacitor 153a.

The display circuit illustrated in FIG. 4B includes a transistor 151b, a liquid crystal element 152b, a capacitor 153b, a capacitor 154, a transistor 155, and a transistor 156.

Note that in the display circuit illustrated in FIG. 4B, the transistor 151b, the transistor 155, and the transistor 156 are field-effect transistors.

A display data signal is input to one of a source and a drain of the transistor 155. A write selection signal (also referred to as a signal WSEL) that is a pulse signal is input to a gate of the transistor 155. The write selection signal can be generated by output of a pulse signal from a shift register included in a circuit, for example.

A first capacitor electrode of the capacitor 154 is electrically connected to the other of the source and the drain of the transistor 155. The voltage $V_c$ is input to a second capacitor electrode of the capacitor 154.

One of a source and a drain of the transistor 151b is electrically connected to the other of the source and the drain of the transistor 155. A display selection signal is input to a gate of the transistor 151b.

A first display electrode of the liquid crystal element 152b is electrically connected to the other of the source and the drain of the transistor 151b. The voltage $V_c$ is input to a second display electrode of the liquid crystal element 152b.

A first capacitor electrode of the capacitor 153b is electrically connected to the other of the source and the drain of the transistor 151b. The voltage $V_c$ is input to a second capacitor electrode of the capacitor 153b. The level of the voltage $V_c$ is set as appropriate in accordance with the specification of the display circuit.

Reference voltage is input to one of a source and a drain of the transistor 156. The other of the source and the drain of the transistor 156 is electrically connected to the other of the source and the drain of the transistor 151b. A display reset signal (also referred to as a signal DRST) that is a pulse signal is input to a gate of the transistor 156.

Further, the components of the display circuits illustrated in FIGS. 4A and 4B are described.

The transistors 151a and 151b function as display selection transistors.

As each of the liquid crystal layers of the liquid crystal elements 152a and 152b, a liquid crystal layer for transmitting light when voltage applied to a first display electrode and a second display electrode is 0 V can be used. For example, a liquid crystal layer containing an electrically controlled birefringence liquid crystal (also referred to as an ECB liquid crystal), a liquid crystal to which a dichroic pigment is added (also referred to as a GH liquid crystal), a polymer dispersed liquid crystal, or a discotic liquid crystal can be used. A liquid crystal layer exhibiting a blue phase may be used as the liquid crystal layer. The liquid crystal layer exhibiting a blue phase contains, for example, a liquid crystal composition including a liquid crystal exhibiting a blue phase and a chiral agent. The liquid crystal exhibiting a blue phase has a short response time of 1 ms or less, and is optically isotropic; thus, alignment treatment is not needed and viewing angle dependence is small. Thus, with the liquid crystal exhibiting a blue phase, operation speed can be improved. For example, the filed-sequential input-output device in the above embodiment needs higher operation speed than a display device using a color filter; thus, it is preferable that the liquid crystal exhibiting a blue phase be used in the liquid crystal element in the filed-sequential input-output device in the above embodiment.

The capacitor 153a functions as a storage capacitor in which voltage whose level is based on a display data signal is applied between the first capacitor electrode and the second capacitor electrode with the transistor 151a. The capacitor 153b functions as a storage capacitor in which voltage whose level is based on a display data signal is applied between the first capacitor electrode and the second capacitor electrode with the transistor 151b. The capacitors 153a and 153b are not necessarily provided; however, with the capacitors 153a and 153b, fluctuation in voltage applied to the liquid crystal elements due to the leakage current of the display selection transistors can be suppressed.

The capacitor 154 functions as a storage capacitor in which voltage whose level is based on a display data signal is applied between the first capacitor electrode and the second capacitor electrode with the transistor 155.

The transistor 155 functions as a write selection transistor for selecting whether a display data signal is input to the capacitor 154.

The transistor 156 functions as a display reset selection transistor for selecting whether voltage applied to the liquid crystal element 152b is reset.

Note that as each of the transistors 151a, 151b, 155, and 156, for example, it is possible to use a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors.

Next, examples of methods for driving the display circuits illustrated in FIGS. 4A and 4B are described.

First, the example of the method for driving the display circuit illustrated in FIG. 4A is described with reference to FIG. 4C. FIG. 4C is a timing chart for illustrating the example of the method for driving the display circuit illustrated in FIG. 4A, which illustrates states of the display data signal and the display selection signal.

In the example of the method for driving the display circuit illustrated in FIG. 4A, the transistor 151a is turned on by input of the pulse of the display selection signal.

When the transistor 151a is turned on, a display data signal is input to the display circuit, so that the voltage level of the first display electrode of the liquid crystal element 152a and the voltage level of the first capacitor electrode of the capacitor 153a are equivalent to the voltage level of the display data signal.

At this time, the liquid crystal element 152a is set to be in a write state (also referred to as a state wt) and the light transmittance of the liquid crystal element 152a is based on the display data signal, so that the display circuit is set to be in a display state based on data of the display data signal (data D11 to data DX).

Then, the transistor 151a is turned off, and the liquid crystal element 152a is set to be in a hold state (also referred to as a state hld) and holds voltage applied between the first display electrode and the second display electrode so that the amount of fluctuation in the voltage from the initial value does not exceed a reference value until when the next pulse of the display selection signal is input. In addition, when the liquid crystal element 152a is in the hold state, the light unit in the input-output device in the above embodiment is lit.

Figure 4D:
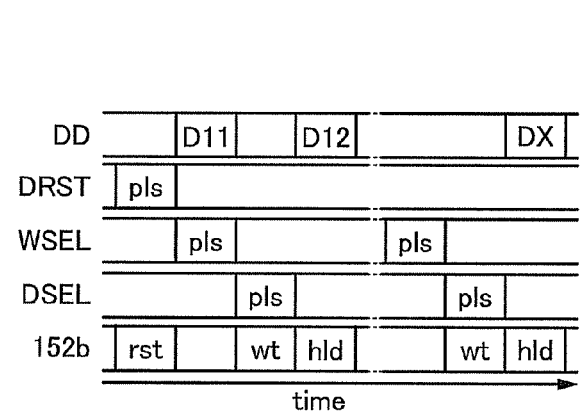

Next, the example of the method for driving the display circuit illustrated in FIG. 4B is described with reference to FIG. 4D. FIG. 4D is a timing chart for illustrating the example of the method for driving the display circuit illustrated in FIG. 4B.

In the example of the method for driving the display circuit illustrated in FIG. 4B, the transistor 156 is turned on by input of the pulse of the display reset signal, so that the voltage of the first display electrode of the liquid crystal element 152b and the voltage of the first capacitor electrode of the capacitor 153b are reset to the reference voltage.

The transistor 155 is turned on by input of the pulse of a write selection signal, and a display data signal is input to the display circuit, so that the voltage level of the first capacitor electrode of the capacitor 154 is equivalent to the voltage level of the display data signal.

After that, the transistor 151b is turned on by input of the pulse of the display selection signal, so that the voltage level of the first display electrode of the liquid crystal element 152b and the voltage level of the first capacitor electrode of the capacitor 153b are equivalent to the voltage level of the first capacitor electrode of the capacitor 154.

At this time, the liquid crystal element 152b is set to be in a write state and the light transmittance of the liquid crystal element 152b is based on the display data signal, so that the display circuit is set to be in a display state based on data of the display data signal (data D11 to data DX).

Then, the transistor 151b is turned off, and the liquid crystal element 152b is set to be in a hold state and holds voltage applied between the first display electrode and the second display electrode so that the amount of fluctuation in the voltage from the initial value does not exceed a reference value until when the next pulse of the display selection signal is input. In addition, when the liquid crystal element 152b is in the hold state, the light unit in the input-output device in the above embodiment is lit.

As described with reference to FIGS. 4A and 4B, the example of the display circuit in this embodiment has a structure in which the display selection transistor and the liquid crystal element are provided. With such a structure, the display circuit can be set to be in a display state based on a display data signal.

Further, as described with reference to FIG. 4B, the example of the display circuit in this embodiment has a structure in which the write selection transistor and the capacitor are provided in addition to the display selection transistor and the liquid crystal element. With such a structure, while the liquid crystal element is set to be in a display state based on data of a display data signal, data of the next display data signal can be written to the capacitor. Thus, the operation speed of the display circuit can be improved.

Embodiment 5

In this embodiment, transistors that can be used as transistors included in the input-output device described in the above embodiment are described.

In the input-output device described in the above embodiment, as the transistor, for example, it is possible to use a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors.

Note that the semiconductor layer may be a single crystal semiconductor layer, a polycrystalline semiconductor layer, a microcrystalline semiconductor layer, or an amorphous semiconductor layer.

In the input-output device described in the above embodiment, as the transistor including the oxide semiconductor layer, for example, a transistor including an oxide semiconductor layer that is highly purified to be intrinsic (also referred to as i-type) or substantially intrinsic can be used. Purification is a general idea including the following cases: the case where hydrogen in an oxide semiconductor layer is removed as much as possible and the case where oxygen is supplied to an oxide semiconductor layer and defects due to oxygen deficiency of the oxide semiconductor layer are reduced.

Structure examples of the transistor including the oxide semiconductor layer are described with reference to FIGS. 5A to 5D. FIGS. 5A to 5D are schematic cross-sectional views each illustrating a structure example of the transistor in this embodiment.

Figure 5A:
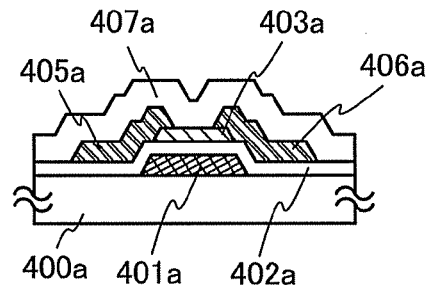
FIGS. 5A to 5D are schematic cross-sectional views each illustrating a structure example of a transistor in Embodiment 5.

The transistor illustrated in FIG. 5A is a kind of bottom-gate transistor called an inverted-staggered transistor.

The transistor illustrated in FIG. 5A includes a conductive layer 401a, an insulating layer 402a, an oxide semiconductor layer 403a, a conductive layer 405a, and a conductive layer 406a.

The conductive layer 401a is provided over a substrate 400a. The insulating layer 402a is provided over the conductive layer 401a. The oxide semiconductor layer 403a overlaps with the conductive layer 401a with the insulating layer 402a provided therebetween. The conductive layer 405a and the conductive layer 406a are each provided over part of the oxide semiconductor layer 403a.

Further, in the transistor illustrated in FIG. 5A, part of a top surface of the oxide semiconductor layer 403a (part of the oxide semiconductor layer 403a over which neither the conductive layer 405a nor the conductive layer 406a is provided) is in contact with an oxide insulating layer 407a.

Figure 5B:
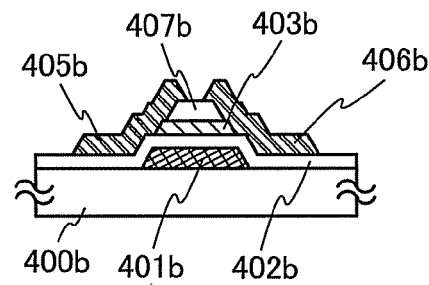

A transistor illustrated in FIG. 5B is a kind of bottom-gate transistor called a channel-protective (channel-stop) transistor and is also called an inverted-staggered transistor.

The transistor illustrated in FIG. 5B includes a conductive layer 401b, an insulating layer 402b, an oxide semiconductor layer 403b, a conductive layer 405b, a conductive layer 406b, and an oxide insulating layer 407b.

The conductive layer 401b is provided over a substrate 400b. The insulating layer 402b is provided over the conductive layer 401b. The oxide semiconductor layer 403b overlaps with the conductive layer 401b with the insulating layer 402b provided therebetween. The oxide insulating layer 407b is provided over the oxide semiconductor layer 403b. The conductive layer 405b and the conductive layer 406b are provided over part of the oxide semiconductor layer 403b with the oxide insulating layer 407b provided therebetween.

Figure 5C:
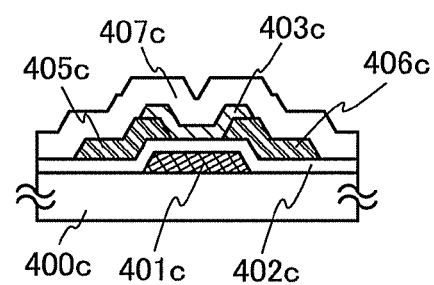

A transistor illustrated in FIG. 5C is a kind of bottom-gate transistor.

The transistor illustrated in FIG. 5C includes a conductive layer 401c, an insulating layer 402c, an oxide semiconductor layer 403c, a conductive layer 405c, and a conductive layer 406c.

The conductive layer 401c is provided over a substrate 400c. The insulating layer 402c is provided over the conductive layer 401c. The conductive layer 405c and the conductive layer 406c are provided over part of the insulating layer 402c. The oxide semiconductor layer 403c overlaps with the conductive layer 401c with the insulating layer 402c provided therebetween.

Further, in FIG. 5C, an upper surface and side surfaces of the oxide semiconductor layer 403c in the transistor are in contact with an oxide insulating layer 407c.

Note that in FIGS. 5A to 5C, a protective insulating layer may be provided over the oxide insulating layer.

Figure 5D:
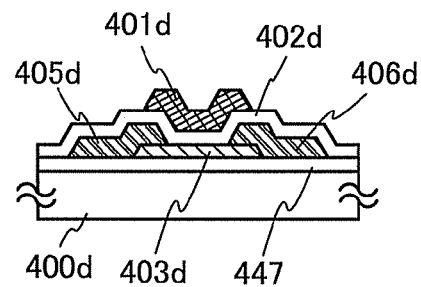

A transistor illustrated in FIG. 5D is a kind of top-gate transistor.

The transistor illustrated in FIG. 5D includes a conductive layer 401d, an insulating layer 402d, an oxide semiconductor layer 403d, a conductive layer 405d, and a conductive layer 406d.

The oxide semiconductor layer 403d is provided over a substrate 400d with an insulating layer 447 provided therebetween. The conductive layer 405d and the conductive layer 406d are provided over part of the oxide semiconductor layer 403d. The insulating layer 402d is provided over the oxide semiconductor layer 403d, the conductive layer 405d, and the conductive layer 406d. The conductive layer 401d overlaps with the oxide semiconductor layer 403d with the insulating layer 402d provided therebetween.

Further, components illustrated in FIGS. 5A to 5D are described.

As each of the substrates 400a to 400d, a light-transmitting substrate such as a glass substrate or a plastic substrate can be used, for example.

The insulating layer 447 functions as a base layer for preventing diffusion of impurity elements from the substrate 400d.

The insulating layer 447 can be, for example, a silicon nitride layer, a silicon oxide layer, a silicon nitride oxide layer, a silicon oxynitride layer, an aluminum oxide layer, or an aluminum oxynitride layer. The insulating layer 447 can be formed using a stack of materials which can be used for the insulating layer 447.

The conductive layers 401a to 401d each function as a gate of the transistor. Note that a layer functioning as a gate of a transistor is also referred to as a gate electrode or a gate wiring.

Note that the transistor in this embodiment may include a conductive layer overlapping with the conductive layer functioning as a gate with the oxide semiconductor layer provided therebetween, in addition to the components of the transistors illustrated in FIGS. 5A to 5D. The conductive layer also functions as a gate of the transistor. With such a structure, the threshold voltage of the transistor can be controlled and light can be prevented from entering the oxide semiconductor layer.

Each of the conductive layers 401a to 401d can be, for example, a layer of a metal material such as molybdenum, titanium, chromium, tantalum, tungsten, aluminum, copper, neodymium, or scandium or an alloy material containing the metal material as a main component. The conductive layers 401a to 401d may be formed using a stack of materials which can be used for the conductive layers 401a to 401d.

The insulating layers 402a to 402d each function as a gate insulating layer of the transistor. Note that a layer functioning as a gate insulating layer of a transistor is also referred to as a gate insulating layer.

As each of the insulating layers 402a to 402c, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a to 402c can be formed using a stack of materials which can be used for the insulating layers 402a to 402c. The oxide insulating layer 402d can be an oxide insulating layer, for example, a silicon oxide layer.

The oxide semiconductor layers 403a to 403d each function as a layer in which a channel of the transistor is formed. Note that the layer in which a channel of the transistor is formed is also referred to as a channel formation layer. Examples of an oxide semiconductor that can be used for the oxide semiconductor layers 403a to 403d include a four-component metal oxide, a three-component metal oxide, and a two-component metal oxide. The oxide semiconductor includes at least one element selected from In, Ga, Sn, Zn, Al, Mg, Hf, or lanthanoid. As the four-component metal oxide, an In—Sn—Ga—Zn—O-based metal oxide or the like can be used, for example. As the three-component metal oxide, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Hf—Zn—O-based metal oxide, an In—La—Zn—O-based metal oxide, an In—Ce—Zn—O-based metal oxide, an In—Pr—Zn—O-based metal oxide, an In—Nd—Zn—O-based metal oxide, an In—Pm—Zn—O-based metal oxide, an In—Sm—Zn—O-based metal oxide, an In—Eu—Zn—O-based metal oxide, an In—Gd—Zn—O-based metal oxide, an In—Tb—Zn—O-based metal oxide, an In—Dy—Zn—O-based metal oxide, an In—Ho—Zn—O-based metal oxide, an In—Er—Zn—O-based metal oxide, an In—Tm—Zn—O-based metal oxide, an In—Yb—Zn—O-based metal oxide, an In—Lu—Zn—O-based metal oxide, or the like can be used, for example. As the two-component metal oxide, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Sn—O-based metal oxide, an In—Ga—O-based metal oxide, or the like can be used, for example. An In—O-based metal oxide, a Sn—O-based metal oxide, a Zn—O-based metal oxide, or the like can be used as the oxide semiconductor, for example. The metal oxide that can be used as the oxide semiconductor may contain silicon oxide.

In the case where an In—Zn—O-based metal oxide is used, for example, an oxide target having the following composition ratios can be used for deposition of an In—Zn—O-based metal oxide semiconductor layer:In:Zn=50:1 to 1:2 ($In_2O_3$:ZnO=25:1 to 1:4 in a molar ratio), preferably In:Zn=20:1 to 1:1 ($In_2O_3$:ZnO=10:1 to 1:2 in a molar ratio), more preferably In:Zn=15:1 to 1.5:1 ($In_2O_3$:ZnO=15:2 to 3:4 in a molar ratio). For example, when the atomic ratio of the target used for the deposition of the In—Zn—O-based oxide semiconductor is expressed by In:Zn:O=P:Q:R, R>1.5P+Q. The increase in the In content makes the mobility of the transistor higher.

As the oxide semiconductor, a material represented by $InMO_3(ZnO)_m$ (m is larger than 0) can be used. Here, M in $InMO_3(ZnO)_m$ represents one or more metal elements selected from Ga, Al, Mn, or Co.

The conductive layers 405a to 405d and the conductive layers 406a to 406d each function as a source or a drain of the transistor. Note that a layer functioning as a source of a transistor is also referred to as a source electrode or a source wiring, and a layer functioning as a drain of a transistor is also referred to as a drain electrode or a drain wiring.

Each of the conductive layers 405a to 405d and the conductive layers 406a to 406d can be, for example, a layer of a metal material such as aluminum, chromium, copper, tantalum, titanium, molybdenum, or tungsten; or an alloy material containing the metal material as a main component. The conductive layers 405a to 405d and the conductive layers 406a to 406d can be formed using a stack of materials which can be used for the conductive layers 405a to 405d and the conductive layers 406a to 406d.

Alternatively, each of the conductive layers 405a to 405d and the conductive layers 406a to 406d can be a layer containing a conductive metal oxide. As the conductive metal oxide, indium oxide, tin oxide, zinc oxide, an alloy of indium oxide and tin oxide, or an alloy of indium oxide and zinc oxide can be used, for example. Note that the conductive metal oxide which can be used for each of the conductive layers 405a to 405d and the conductive layers 406a to 406d may contain silicon oxide.

The oxide insulating layers 407a to 407c can be, for example, a silicon oxide layer or the like. Note that the oxide insulating layer 407b functions as a layer for protecting a channel formation layer of the transistor (such a layer is also referred to as a channel protective layer).

Note that the transistor in this embodiment does not necessarily have a structure in which the entire oxide semiconductor layer overlaps with the conductive layer functioning as a gate electrode as illustrated in FIGS. 5A to 5D. However, when the transistor in this embodiment has a structure in which the entire oxide semiconductor layer overlaps with the conductive layer functioning as a gate electrode, light can be prevented from entering the oxide semiconductor layer.

As an example of a method for forming the transistor in this embodiment, an example of a method for forming the transistor illustrated in FIG. 5A is described with reference to FIGS. 6A to 6E. FIGS. 6A to 6E are schematic cross-sectional views illustrating the example of the method for forming the transistor in FIG. 5A.

Figure 6A:
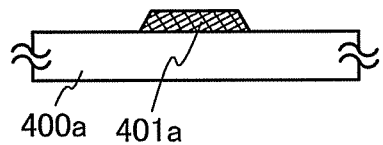
FIGS. 6A to 6E are schematic cross-sectional views illustrating an example of a method for forming the transistor in FIG. 5A.

First, as illustrated in FIG. 6A, the substrate 400a is prepared and a first conductive film is formed over the substrate 400a. Part of the first conductive film is etched so that the conductive layer 401a is formed.

For example, the first conductive film can be formed by formation of a layer of a material that can be used for the conductive layer 401a by sputtering. Alternatively, the first conductive film can be formed using a stack of layers of materials that can be used for the conductive layer 401a.

Note that when a high-purity gas from which an impurity such as hydrogen, water, a hydroxyl group, or hydride is removed is used as a sputtering gas, for example, the impurity concentration in the film can be lowered.

Note that preheating treatment may be performed in a preheating chamber of a sputtering apparatus before the film is formed by sputtering. By the preheating treatment, an impurity such as hydrogen or moisture can be eliminated.

Before the film is formed by sputtering, for example, treatment by which voltage is applied to a substrate side, not to a target side, in an argon, nitrogen, helium, or oxygen atmosphere with the use of an RF power and plasma is generated so that a surface of the substrate on which the film is formed is modified (such treatment is also referred to as reverse sputtering) may be performed. By reverse sputtering, powdery substances (also referred to as particles or dust) that attach onto the surface on which the film is formed can be removed.

In the case where the film is formed by sputtering, moisture remaining in a deposition chamber for the film can be removed by an adsorption vacuum pump or the like. A cryopump, an ion pump, a titanium sublimation pump, or the like can be used as the adsorption vacuum pump. Alternatively, moisture remaining in the deposition chamber can be removed by a turbo pump provided with a cold trap.

For example, a resist mask is formed over part of the first conductive film by a photolithography process and the first conductive film is etched using the resist mask, so that the conductive layer 401a can be formed. Note that in that case, the resist mask is removed after the conductive layer 401a is formed.

The resist mask may be formed by an inkjet method. A photomask is not needed in an inkjet method; thus, manufacturing cost can be reduced. In addition, the resist mask may be formed using an exposure mask having a plurality of regions with different transmittances (such an exposure mask is also referred to as a multi-tone mask). With the multi-tone mask, a resist mask having a plurality of regions with different thicknesses can be formed, so that the number of resist masks used for the formation of the transistor can be reduced.

Figure 6B:
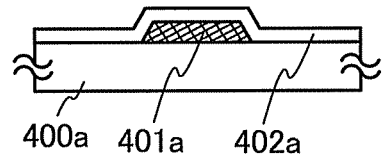

Next, as illustrated in FIG. 6B, the insulating layer 402a is formed by formation of a first insulating film over the conductive layer 401a.

For example, the first insulating film can be formed by formation of a layer of a material that can be used for the insulating layer 402a by sputtering, plasma-enhanced CVD, or the like. The first insulating film can be formed by a stack of layers of materials that can be used for the insulating layer 402a. Further, when the layer of a material that can be used for the insulating layer 402a is formed by high-density plasma-enhanced CVD (e.g., high-density plasma-enhanced CVD using microwaves (e.g., microwaves with a frequency of 2.45 GHz)), the insulating layer 402a can be dense and can have higher breakdown voltage.

Figure 6C:
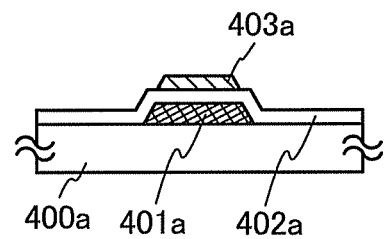

Then, as illustrated in FIG. 6C, an oxide semiconductor film is formed over the insulating layer 402a. After that, part of the oxide semiconductor film is etched, so that the oxide semiconductor layer 403a is formed.

For example, the oxide semiconductor film can be formed by formation of a layer of an oxide semiconductor material that can be used for the oxide semiconductor layer 403a by sputtering. Note that the oxide semiconductor film may be formed in a rare gas atmosphere, an oxygen atmosphere, or a mixed atmosphere of a rare gas and oxygen.

For example, the oxide semiconductor film can be formed using an oxide target having a composition ratio of $In_2O_3:Ga_2O_3:ZnO=1:1:1$ (in a molar ratio) as a sputtering target. Alternatively, for example, the oxide semiconductor film may be formed using an oxide target having a composition ratio of $In_2O_3:Ga_2O_3:ZnO=1:1:2$ (in a molar ratio).

When the oxide semiconductor film is formed by sputtering, the substrate 400a may be kept under reduced pressure and heated at 100 to 600° C., preferably 200 to 400° C. By heating of the substrate 400a, the impurity concentration in the oxide semiconductor film can be lowered and damage to the oxide semiconductor film during the sputtering can be reduced.

For example, the oxide semiconductor film is etched using a resist mask which is formed over part of the oxide semiconductor film by a photolithography process, so that the oxide semiconductor layer 403a can be formed. Note that in that case, the resist mask is removed after the oxide semiconductor film is etched.

Figure 6D:
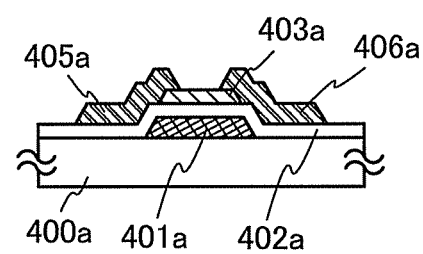

Then, as illustrated in FIG. 6D, a second conductive film is formed over the insulating layer 402a and the oxide semiconductor layer 403a and partly etched so that the conductive layers 405a and 406a are formed.

For example, the second conductive film can be formed by formation of a layer of a material that can be used for the conductive layers 405a and 406a by sputtering or the like. Alternatively, the second conductive film can be formed using a stack of films of materials that can be used for the conductive layers 405a and 406a.

For example, a resist mask is formed over part of the second conductive film by a photolithography process and the second conductive film is etched using the resist mask, so that the conductive layers 405a and 406a can be formed. Note that in that case, the resist mask is removed after the conductive layers 405a and 406a are formed.

Figure 6E:
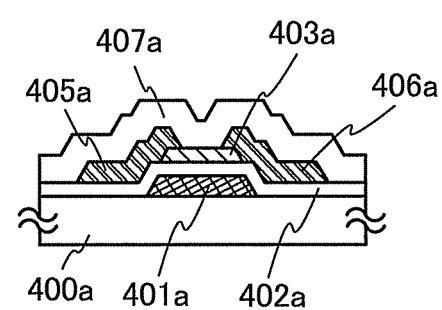

Then, as illustrated in FIG. 6E, the oxide insulating layer 407a is formed so as to be in contact with the oxide semiconductor layer 403a.

For example, the oxide insulating layer 407a can be formed by formation of a film that can be used for the oxide insulating layer 407a in a rare gas (typically, argon) atmosphere, an oxygen atmosphere, or a mixed atmosphere of a rare gas and oxygen by sputtering. By formation of the oxide insulating layer 407a by sputtering, the decrease in resistance of part of the oxide semiconductor layer 403a that functions as a back channel of the transistor can be prevented. The temperature of the substrate at the time of the formation of the oxide insulating layer 407a is preferably higher than or equal to room temperature and lower than or equal to 300° C.

Before the formation of the oxide insulating layer 407a, plasma treatment using a gas such as $N_2O$, $N_2$, or Ar may be performed so that water or the like adsorbed onto an exposed surface of the oxide semiconductor layer 403a is removed. In the case where the plasma treatment is performed, the oxide insulating layer 407a is preferably formed after the plasma treatment without exposure to air.

In addition, in the example of the method for forming the transistor illustrated in FIG. 5A, heat treatment is performed at higher than or equal to 400° C. and lower than or equal to 750° C., or higher than or equal to 400° C. and lower than the strain point of the substrate, for example. For example, the heat treatment is performed after the oxide semiconductor film is formed, after part of the oxide semiconductor film is etched, after the second conductive film is formed, after part of the second conductive film is etched, or after the oxide insulating layer 407a is formed.

Note that a heat treatment apparatus for the heat treatment can be an electric furnace or an apparatus for heating an object by heat conduction or heat radiation from a heater such as a resistance heater. For example, an RTA (rapid thermal annealing) apparatus such as a GRTA (gas rapid thermal annealing) apparatus, or an LRTA (lamp rapid thermal annealing) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus with which heat treatment is performed using a high-temperature gas. As the high-temperature gas, for example, a rare gas or an inert gas (e.g., nitrogen) which does not react with an object by heat treatment can be used.

After the heat treatment, a high-purity oxygen gas, a high-purity $N_2O$ gas, or ultra-dry air (with a dew point of $-40°$ C. or lower, preferably $-60°$ C. or lower) may be introduced into the furnace that has been used in the heat treatment while the heating temperature is maintained or decreased. In that case, it is preferable that water, hydrogen, and the like be not contained in the oxygen gas or the $N_2O$ gas. The purity of the oxygen gas or the $N_2O$ gas which is introduced into the heat treatment apparatus is preferably 6N or higher, more preferably 7N or higher. That is, the impurity concentration in the oxygen gas or the $N_2O$ gas is 1 ppm or lower, preferably 0.1 ppm or lower. By the action of the oxygen gas or the $N_2O$ gas, oxygen is supplied to the oxide semiconductor layer $403a$, so that defects caused by oxygen deficiency in the oxide semiconductor layer $403a$ can be reduced.

Further, in addition to the heat treatment, after the oxide insulating layer $407a$ is formed, heat treatment (preferably at 200 to $400°$ C., for example, 250 to $350°$ C.) may be performed in an inert gas atmosphere or an oxygen gas atmosphere.

Further, oxygen doping treatment using oxygen plasma may be performed after the formation of the insulating layer $402a$, after the formation of the oxide semiconductor film, after the formation of the conductive layer serving as a source electrode or a drain electrode, after the formation of the oxide insulating layer, or after the heat treatment. For example, oxygen doping treatment using a high-density plasma of 2.45 GHz may be performed. By the oxygen doping treatment, variations in electrical characteristics of the transistors can be reduced.

Through the steps, an impurity such as hydrogen, moisture, a hydroxyl group, or hydride (also referred to as a hydrogen compound) is removed from the oxide semiconductor layer $403a$ and oxygen is supplied to the oxide semiconductor layer $403a$. Thus, the oxide semiconductor layer can be highly purified.

Note that although the example of the method for forming the transistor illustrated in FIG. 5A is described, this embodiment is not limited to this example. For example, as for the components in FIGS. 5B to 5D that have the same designations as the components in FIG. 5A and whose functions are at least partly the same as those of the components in FIG. 5A, the description of the example of the method for forming the transistor illustrated in FIG. 5A can be referred to as appropriate.

As described with reference to FIGS. 5A to 5D and FIGS. 6A to 6E, the example of the transistor in this embodiment includes a conductive layer functioning as a gate electrode; an insulating layer functioning as a gate insulating layer; an oxide semiconductor layer which includes a channel and overlaps with conductive layer functioning as a gate with the insulating layer functioning as a gate insulating layer provided therebetween; a conductive layer which is electrically connected to the oxide semiconductor layer and functions as one of a source and a drain; and a conductive layer which is electrically connected to the oxide semiconductor layer and functions as the other of the source and the drain.

The oxide semiconductor layer in which a channel is formed is an oxide semiconductor layer which is made to be intrinsic (i-type) or substantially intrinsic (i-type) by purification. By purification of the oxide semiconductor layer, the carrier concentration in the oxide semiconductor layer can be lower than $1\times10^{14}/cm^3$, preferably lower than $1\times10^{12}/cm^3$, more preferably lower than $1\times10^{11}/cm^3$, so that changes in characteristics due to temperature change can be suppressed. Further, with the above structure, off-state current per micrometer of channel width can be 10 aA ($1\times10^{-17}$ A) or less, 1 aA ($1\times10^{-18}$ A) or less, 10 zA ($1\times10^{-20}$ A) or less, 1 zA ($1\times10^{-21}$ A) or less, or 100 yA ($1\times10^{-22}$ A) or less. It is preferable that the off-state current of the transistor be as low as possible. The lower limit of the off-state current of the transistor in this embodiment is estimated at about $10^{-30}$ A/μm.

A calculation example of the off-state current of the example of the transistor including an oxide semiconductor layer in this embodiment, in which leakage current measurement with a circuit for evaluating characteristics is utilized, is described below.

Figure 7A:
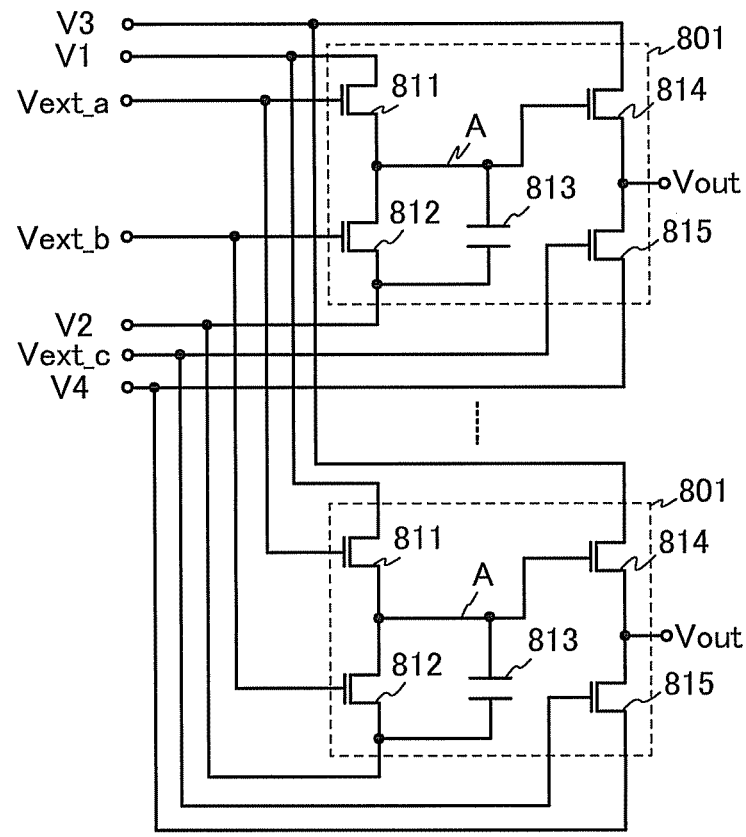
FIGS. 7A and 7B illustrate a circuit for evaluating characteristics.
Figure 7B:
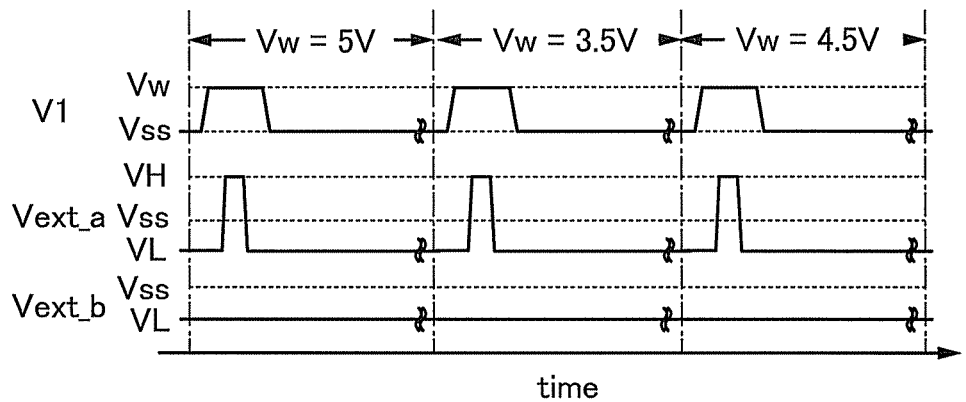

The leakage current measurement with a circuit for evaluating characteristics is described with reference to FIGS. 7A and 7B. FIGS. 7A and 7B illustrate the circuit for evaluating characteristics.

First, the structure of the circuit for evaluating characteristics is described with reference to FIG. 7A. FIG. 7A is a circuit diagram illustrating the structure of the circuit for evaluating characteristics.

The circuit for evaluating characteristics illustrated in FIG. 7A includes a plurality of measurement systems 801. The plurality of measurement systems 801 are connected in parallel. Here, as an example, eight measurement systems 801 are connected in parallel. Plural kinds of measurement can be performed using the plurality of measurement systems 801.

The measurement system 801 includes a transistor 811, a transistor 812, a capacitor 813, a transistor 814, and a transistor 815.

Voltage V1 is input to one of a source and a drain of the transistor 811, and voltage Vext_a is input to a gate of the transistor 811. The transistor 811 is a transistor for injecting electrical charge.

One of a source and a drain of the transistor 812 is connected to the other of the source and the drain of the transistor 811. Voltage V2 is input to the other of the source and the drain of the transistor 812. Voltage Vext_b is input to a gate of the transistor 812. The transistor 812 is a transistor for evaluating leakage current. Note that the leakage current here includes the off-state current of a transistor.

A first capacitor electrode of the capacitor 813 is connected to the other of the source and the drain of the transistor 811. The voltage V2 is input to a second capacitor electrode of the capacitor 813. Note that here, the voltage V2 is 0 V.

Voltage V3 is input to one of a source and a drain of the transistor 814. A gate of the transistor 814 is connected to the other of the source and the drain of the transistor 811. Note that a portion where the gate of the transistor 814, the other of the source and the drain of the transistor 811, the one of the source and the drain of the transistor 812, and the first capacitor electrode of the capacitor 813 are connected to each other is referred to as a node A. Note that here, the voltage V3 is 5 V.

One of a source and a drain of the transistor 815 is connected to the other of the source and the drain of the transistor 814. Voltage V4 is input to the other of the source and the drain of the transistor 815. Voltage Vext_c is input to a gate of the transistor 815. Note that here, the voltage Vext_c is 0.5 V.

The measurement system 801 outputs the voltage of a portion where the other of the source and the drain of the transistor 814 is connected to the one of the source and the drain of the transistor 815, as output voltage Vout.

Here, a transistor having a channel length L of 10 μm and a channel width W of 10 μm and including an oxide semiconductor layer is used as an example of the transistor 811. A transistor having a channel length L of 3 μm and a channel width W of 100 μm and including an oxide semiconductor layer is used as an example of each of the transistors 814 and 815. A bottom-gate transistor including an oxide semiconductor layer in which a source and drain electrodes are on and in contact with the oxide semiconductor layer, a region where the source and drain electrodes overlap with a gate electrode is not provided, and an offset region with a width of 1 μm is provided is used as an example of the transistor 812. Provision of the offset region can reduce parasitic capacitance. Further, as the transistor 812, samples (also referred to as SMP) of six transistors having different channel lengths L and different channel widths W are used (see Table 1).

TABLE 1

| | L[μm] | W[μm] |
|---|---|---|
| SMP1 | 1.5 | $1 \times 10^5$ |
| SMP2 | 3 | $1 \times 10^5$ |
| SMP3 | 10 | $1 \times 10^5$ |
| SMP4 | 1.5 | $1 \times 10^6$ |
| SMP5 | 3 | $1 \times 10^6$ |
| SMP6 | 10 | $1 \times 10^6$ |

By separately providing a transistor for injecting electrical charge and a transistor for evaluating leakage current as illustrated in FIG. 7A, the transistor for evaluating leakage current can be always kept off at the time of electrical charge injection. Without provision of the transistor for injecting electrical charge, the transistor for evaluating leakage current needs to be turned on at the time of electrical charge injection. In that case, if the transistor for evaluating leakage current is an element that takes a long time to turn into a steady off-state from an on-state, the measurement takes a long time.

In addition, by separately providing a transistor for injecting electrical charge and a transistor for evaluating leakage current, each of the transistors can have appropriate size. Further, by making the channel width W of the transistor for evaluating leakage current larger than that of the transistor for injecting electrical charge, the leakage current component of the circuit for evaluating characteristics other than the leakage current of the transistor for evaluating leakage current can be made relatively low. Accordingly, the leakage current of the transistor for evaluating leakage current can be measured with high accuracy. Further, the transistor for evaluating leakage current does not need to be turned on at the time of electrical charge injection; thus, there is no influence of fluctuation in the voltage of the node A caused by part of the electrical charge in the channel formation region of the transistor for evaluating leakage current flowing to the node A.

In contrast, by making the channel width W of the transistor for injecting electrical charge smaller than that of the transistor for evaluating leakage current, the leakage current of the transistor for injecting electrical charge can be made relatively low. Further, there is small influence of fluctuation in the voltage of the node A caused by part of the electrical charge in the channel formation region flowing to the node A at the time of electrical charge.

Next, a method for measuring the leakage current of the circuit for evaluating characteristics illustrated in FIG. 7A is described with referent to FIG. 7B. FIG. 7B is a timing chart for describing the method for measuring the leakage current with the use of the circuit for evaluating characteristics illustrated in FIG. 7A.

In the method for measuring the leakage current with the use of the circuit for evaluating characteristics illustrated in FIG. 7A, a period is divided into a writing period and a holding period. The operation in each period is described below.

In the writing period, voltage VL (−3 V) that turns off the transistor 812 is input as the voltage Vext_b. Further, write voltage Vw is input as the voltage V1, and then, voltage VH (5 V) that keeps the transistor 811 on for a certain period is input as the voltage Vext_a. Thus, electrical charge is accumulated in the node A, and the voltage of the node A is equivalent to the write voltage Vw. Then, the voltage VL that turns off the transistor 811 is input as the voltage Vext_a. Then, voltage VSS (0 V) is input as the voltage V1.

In the holding period, the amount of change in the voltage of the node A due to the change in the amount of electrical charge held in the node A is measured. From the amount of change in voltage, the value of current flowing between the source electrode and the drain electrode of the transistor 812 can be calculated. As described above, electrical charge can be accumulated in the node A, and the amount of change in the voltage of the node A can be measured.

At this time, accumulation of electrical charge in the node A and measurement of the amount of change in the voltage of the node. A (also referred to as accumulation and measurement operation) are repeated. First, first accumulation and measurement operation is repeated 15 times. In the first accumulation and measurement operation, a voltage of 5 V is input as the write voltage Vw in a writing period and is held for 1 h in a holding period. Next, second accumulation and measurement operation is repeated twice. In the second accumulation and measurement operation, a voltage of 3.5 V is input as the write voltage Vw in a writing period and is held for 50 h in a holding period. Then, third accumulation and measurement operation is performed once. In the third accumulation and measurement operation, a voltage of 4.5 V is input as the write voltage Vw in a writing period and is held for 10 h in a holding period. By repeating the accumulation and measurement operation, it can be confirmed that measured current values are values in the steady state. In other words, it is possible to remove transient current (current decreasing over time after the start of the measurement) from $I_A$ (current flowing through the node A). Accordingly, leakage current can be measured with higher accuracy.

In general, the voltage $V_A$ of the node A is expressed by Formula 1 as a function of the output voltage Vout.

[Formula 1]

$$V_A = F(V\text{out}) \qquad (1)$$

In addition, the electrical charge $Q_A$ of the node A is expressed by Formula 2 using the voltage $V_A$ of the node A, capacitance $C_A$ connected to the node A, and a constant (const). Here, the capacitance $C_A$ connected to the node A is the sum of the capacitance of the capacitor 813 and the capacitance components other than the capacitance of the capacitor 813.

[Formula 2]

$$Q_A = C_A V_A + \text{const} \qquad (2)$$

The current $I_A$ of the node A is a time-derivative term of electrical charge flowing to the node A (or electrical charge flowing from the node A), and is thus expressed by Formula 3.

[Formula 3]

$$I_A \equiv \frac{\Delta Q_A}{\Delta t} = \frac{C_A \cdot \Delta F(Vout)}{\Delta t} \quad (3)$$

Note that here, as an example, Δt is about 54000 s. The current $I_A$ of the node A, which is leakage current, can be obtained from the capacitance $C_A$ connected to the node A and the output voltage Vout in this manner; thus, the leakage current of the circuit for evaluating characteristics can be obtained.

Next, measurement results of the output voltage obtained by the measurement method using the circuit for evaluating characteristics, and the leakage current of the circuit for evaluating characteristics that is calculated from the measurement results are described with reference to FIGS. 8A and 8B.

Figure 8A:
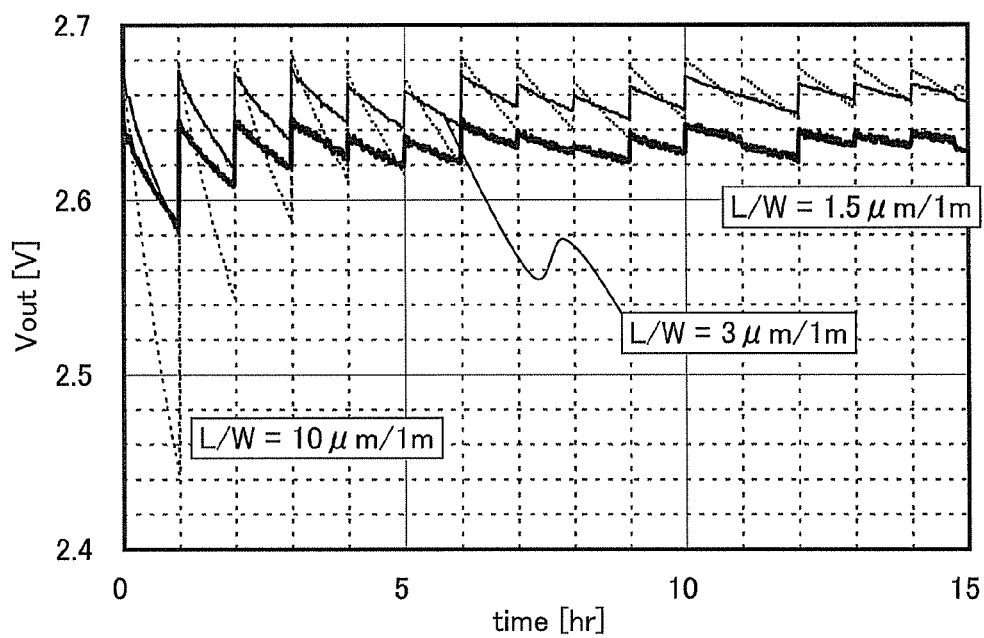
FIG. 8A illustrates a relationship between elapsed time Time in measurement of Samples 4, 5, and 6 (SMPs 4, 5, 6) and output voltage Vout.
Figure 8B:
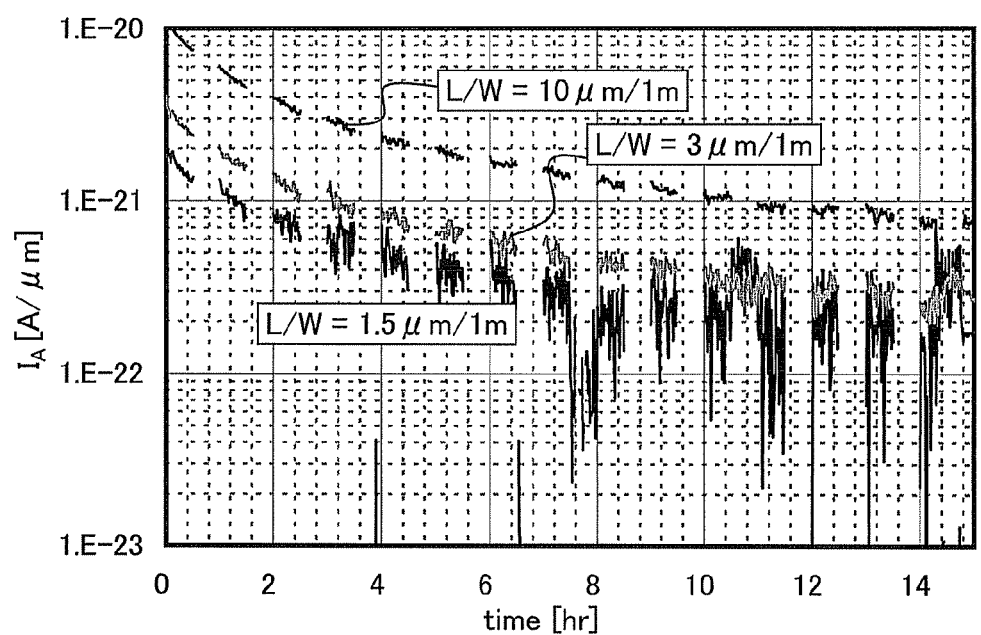
FIG. 8B illustrates a relationship between the elapsed time Time in the measurement of Samples 4, 5, and 6 (SMPs 4, 5, 6) and leakage current calculated from the measurement.

For example, FIG. 8A illustrates the relationship between the elapsed time Time of the measurement (the first accumulation and measurement operation) and the output voltage Vout in the transistors of SMP4, SMP5, and SMP6. FIG. 8B illustrates the relationship between the elapsed time Time of the measurement and the current $I_A$ calculated by the measurement. FIG. 8A shows that the output voltage Vout fluctuates after the start of the measurement and it takes 10 h or longer for the transistors to go into the steady state.

Figure 9:
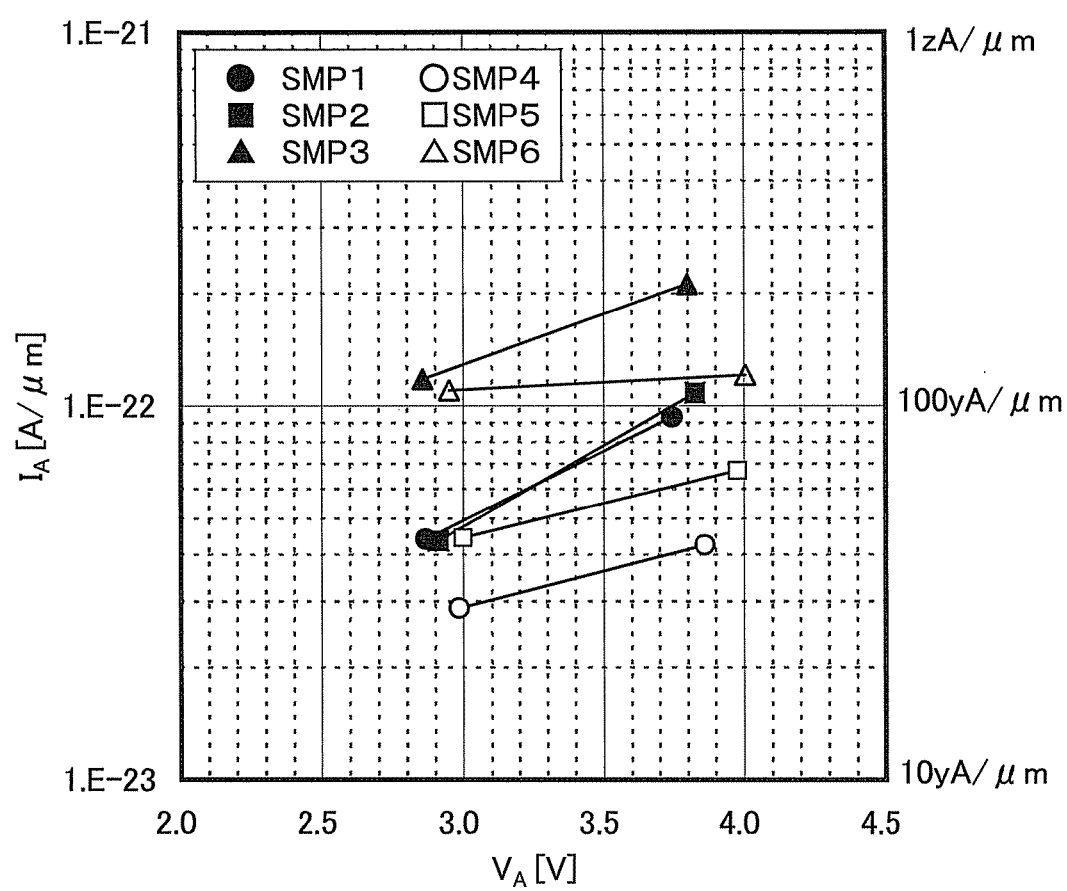
FIG. 9 illustrates a relationship between voltage of a node A and leakage current estimated from the measurement.

FIG. 9 illustrates the relationship between the voltage of the node A and the leakage current in the SMP1 to SMP6 estimated from values obtained in the measurement. In FIG. 9, for example, in the case of SMP4, leakage current is 28 yA/μm when the voltage of the node A is 3.0 V. Since the leakage current includes the off-state current of the transistor 812, the off-state current of the transistor 812 can be considered to be 28 yA/μm or lower.

Figure 10:
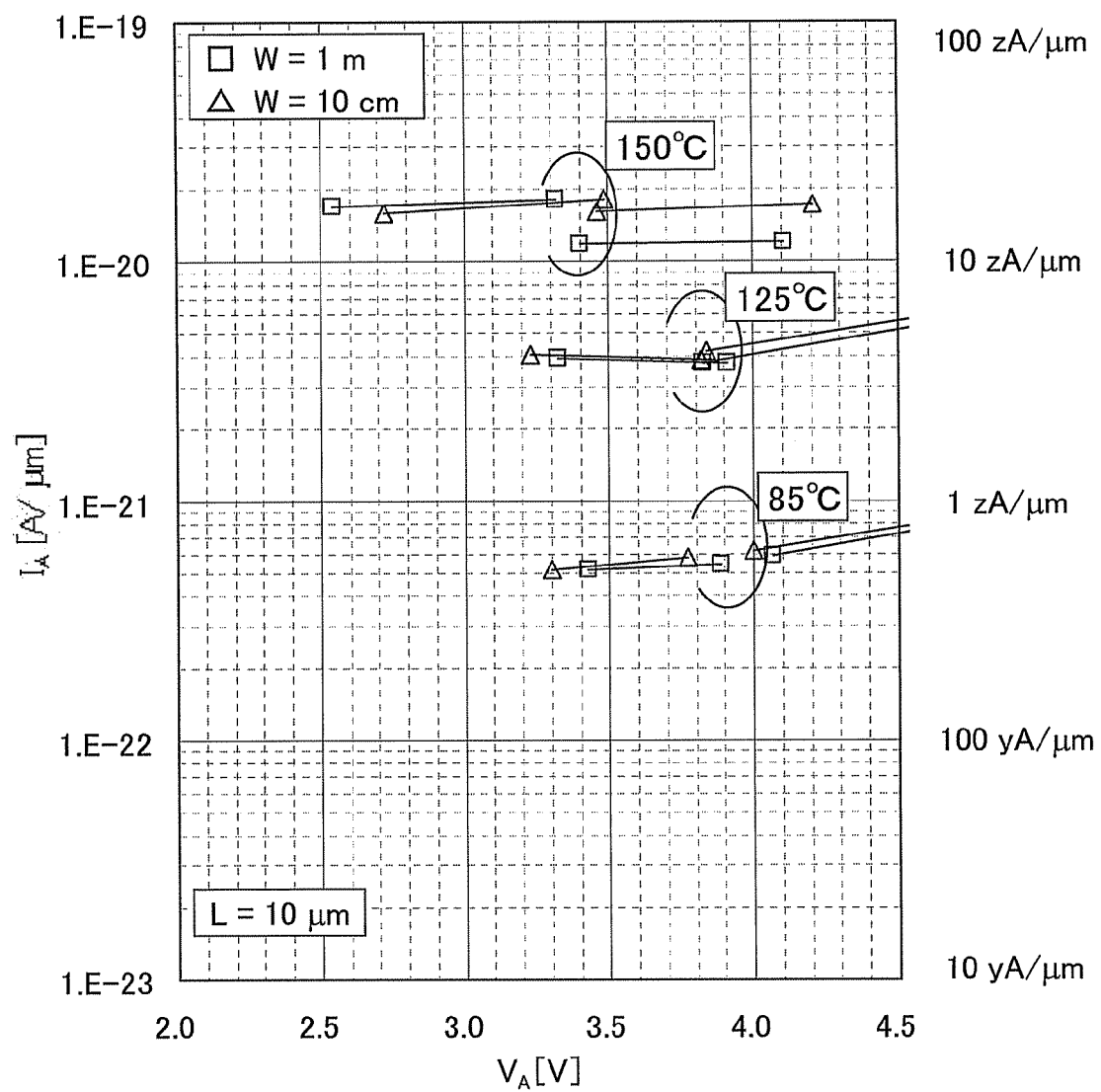
FIG. 10 illustrates a relationship between voltage of the node A and leakage current estimated from the measurement.
Figure 11:
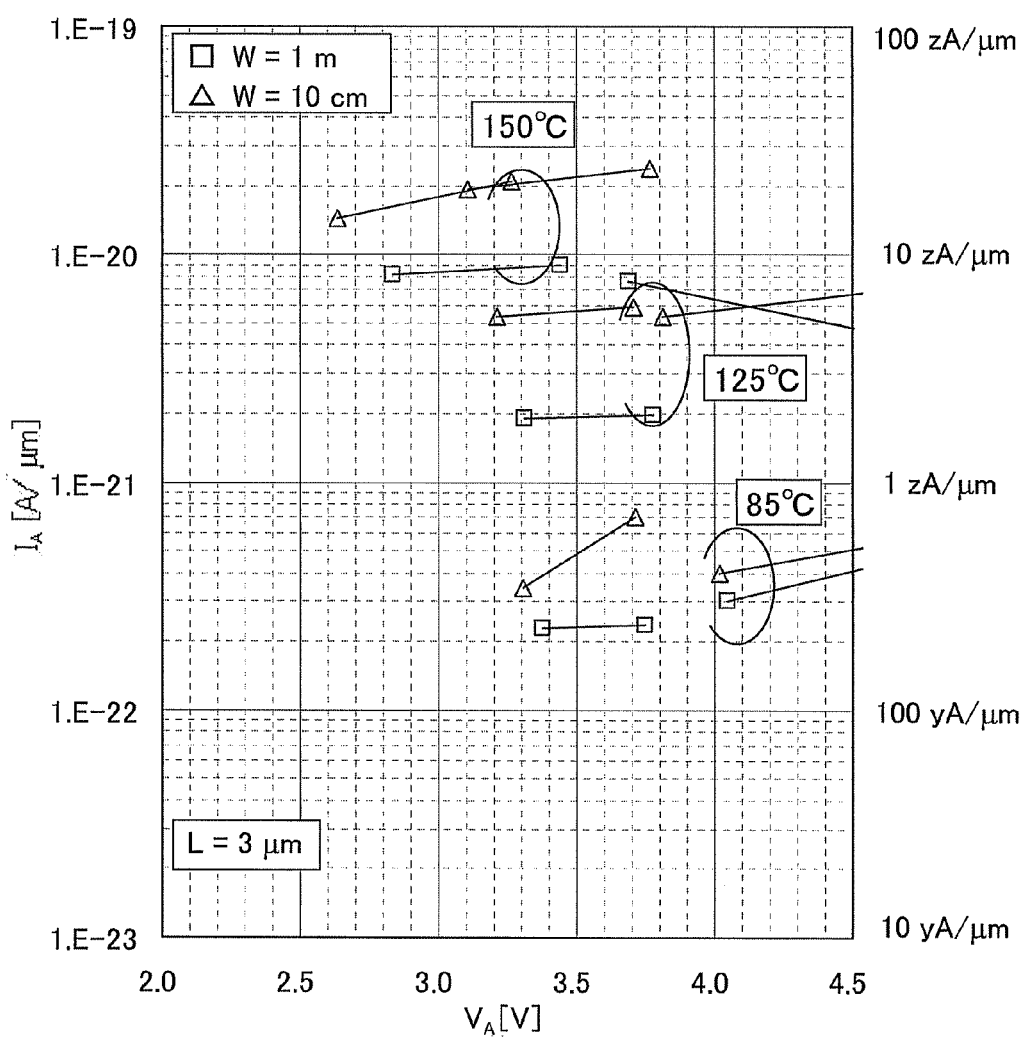
FIG. 11 illustrates a relationship between voltage of the node A and leakage current estimated from the measurement.
Figure 12:
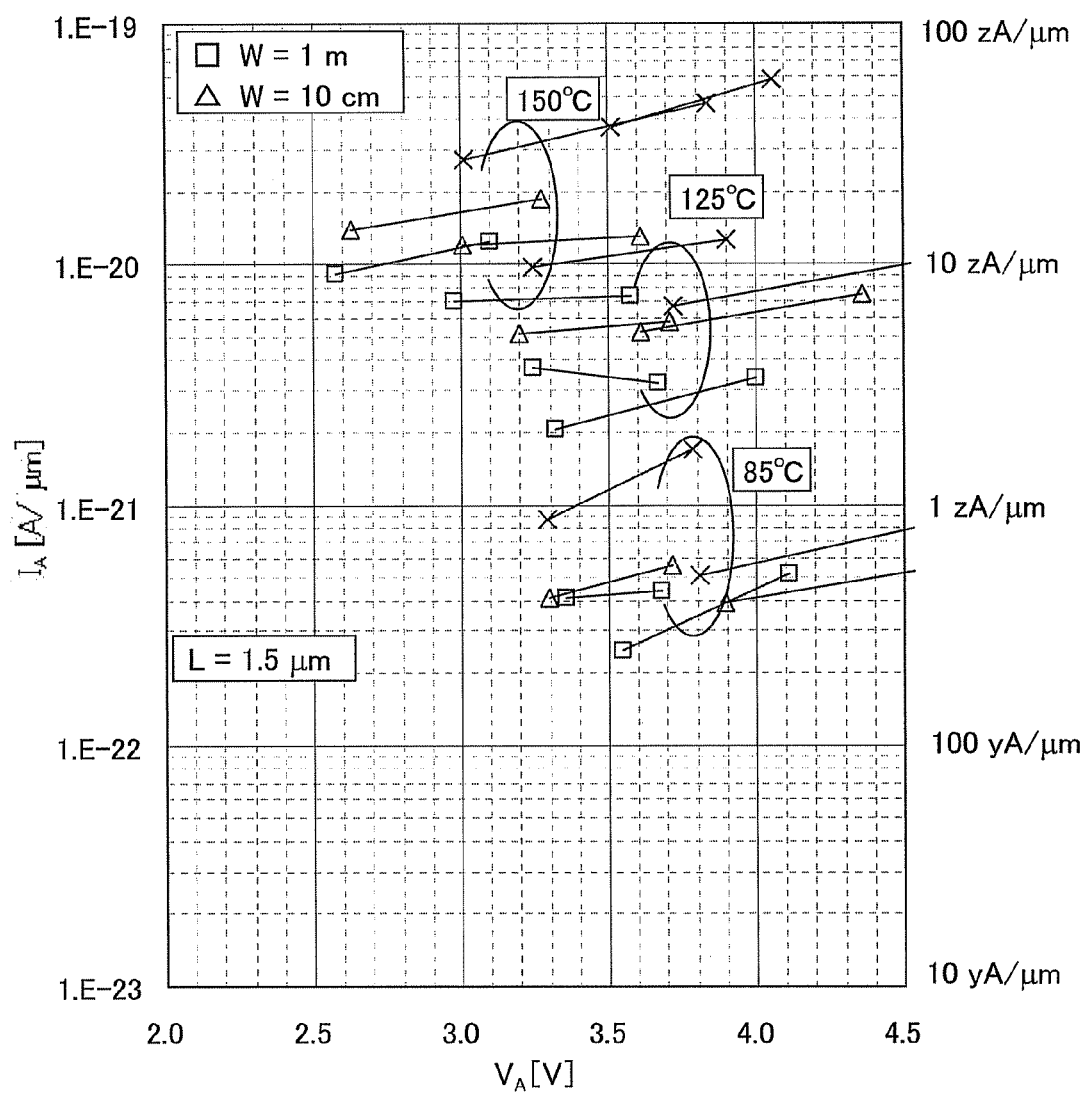
FIG. 12 illustrates a relationship between voltage of the node A and leakage current estimated from the measurement.

FIG. 10, FIG. 11, and FIG. 12 illustrate the relationship between the voltage of the node A and the leakage current in the SMP1 to SMP6 estimated from the measurement at 85° C., 125° C., and 150° C. As illustrated in FIG. 10, FIG. 11, and FIG. 12, even at 150° C., the leakage current is 100 zA/μm or lower.

As described above, the leakage current of the circuit for evaluating characteristics using a transistor including a highly-purified oxide semiconductor layer serving as a channel formation layer is sufficiently low, which means that the off-state current of the transistor is sufficiently low. In addition, it turns out that the off-state current of the transistor is sufficiently low even when the temperature rises.

Embodiment 6

In this embodiment, structure examples of the input-output device in the above embodiment are described.

The input-output device in this embodiment includes a first substrate (an active matrix substrate) provided with a semiconductor element such as a transistor, a second substrate, and a liquid crystal layer provided between the first substrate and the second substrate.

Figure 13A:
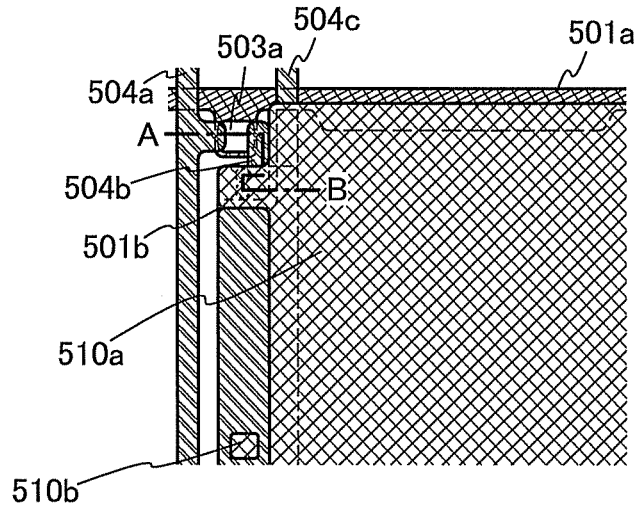
FIGS. 13A and 13B illustrate a structure example of an active-matrix substrate in Embodiment 6.
Figure 13B:
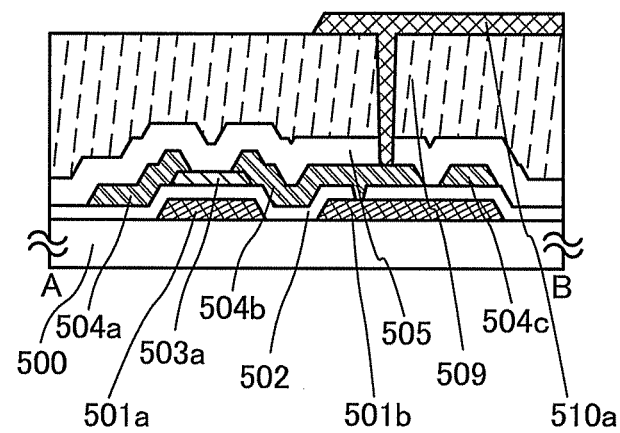
Figure 14A:
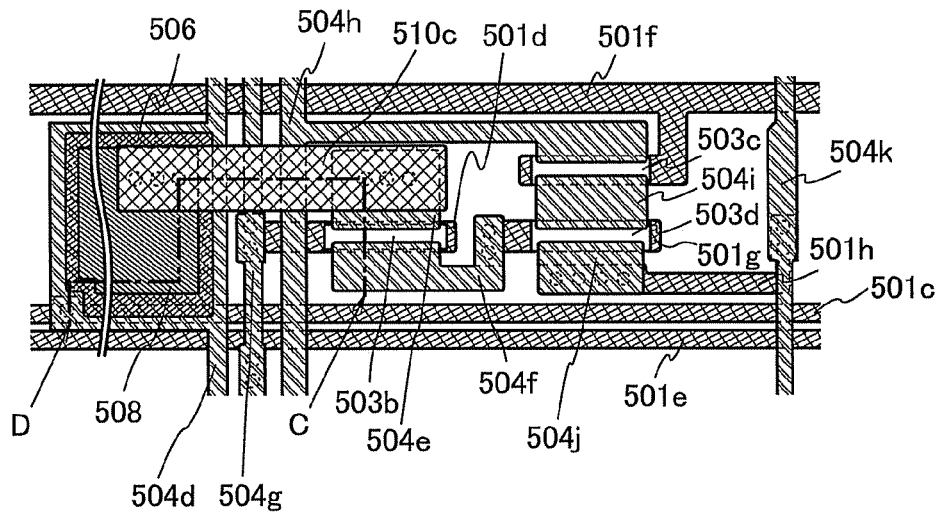
FIGS. 14A and 14B illustrate a structure example of an active-matrix substrate in Embodiment 6.
Figure 14B:
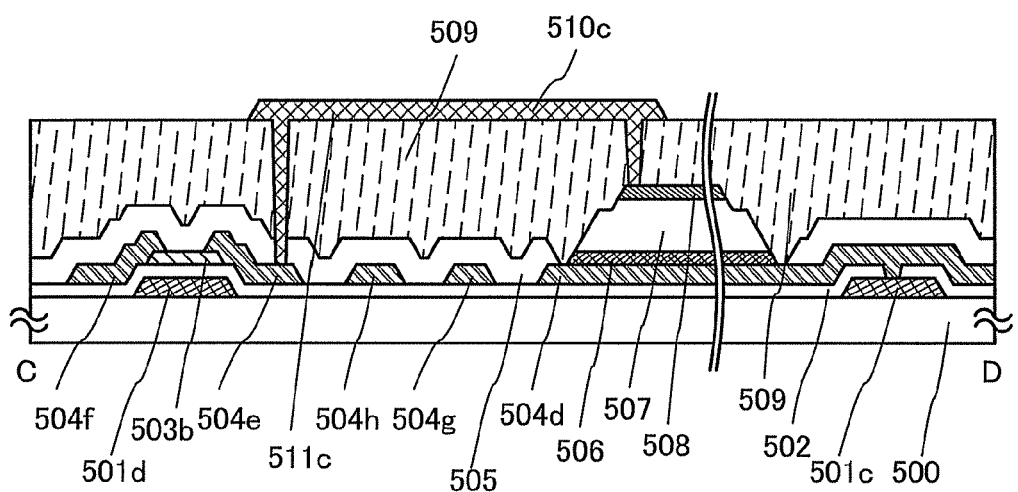

First, structure examples of the active matrix substrate in this embodiment are described with reference to FIGS. 13A and 13B and FIGS. 14A and 14B. FIGS. 13A and 13B and FIGS. 14A and 14B illustrate structure examples of the active matrix substrate in the input-output device of this embodiment. FIG. 13A is a schematic plan view, and FIG. 13B is a schematic cross-sectional view taken along line A-B in FIG. 13A. FIG. 14A is a schematic plan view, and FIG. 14B is a schematic cross-sectional view taken along line C-D in FIG. 14A. Note that in FIGS. 14A and 14B, a photodetector with the structure of FIG. 3A is used as an example of a photodetector. In FIGS. 13A and 13B and FIGS. 14A and 14B, the transistor with the structure described with reference to FIG. 5A is used as an example of a transistor.

The active matrix substrate illustrated in FIGS. 13A and 13B and FIGS. 14A and 14B includes a substrate 500, conductive layers 501a to 501h, an insulating layer 502, semiconductor layers 503a to 503d, conductive layers 504a to 504k, an insulating layer 505, a semiconductor layer 506, a semiconductor layer 507, a semiconductor layer 508, an insulating layer 509, and conductive layers 510a to 510c.

Each of the conductive layers 501a to 501h is formed over one surface of the substrate 500.

The conductive layer 501a functions as a gate of a display selection transistor in a display circuit.

The conductive layer 501b functions as a first capacitor electrode of a storage capacitor in the display circuit. Note that a layer that functions as a first capacitor electrode of a capacitor (a storage capacitor) is also referred to as a first capacitor electrode.

The conductive layer 501c functions as a wiring through which the voltage $V_b$ is input. Note that a layer that functions as a wiring is also referred to as a wiring.

The conductive layer 501d functions as a gate of a photodetection control transistor in the photodetector.

The conductive layer 501e functions as a signal line through which a photodetection control signal is input. Note that a layer that functions as a signal line is also referred to as a signal line.

The conductive layer 501f functions as a gate of an output control transistor in the photodetector.

The conductive layer 501g functions as a gate of an amplifier transistor in the photodetector.

The insulating layer 502 is provided over the one surface of the substrate 500 with the conductive layers 501a to 501h provided therebetween.

The insulating layer 502 functions as a gate insulating layer of the display selection transistor in the display circuit, a dielectric layer of the storage capacitor in the display circuit, a gate insulating layer of the photodetection control transistor in the photodetector, a gate insulating layer of the amplifier transistor in the photodetector, and a gate insulating layer of the output selection transistor in the photodetector.

The semiconductor layer 503a overlaps with the conductive layer 501a with the insulating layer 502 provided therebetween. The semiconductor layer 503a functions as a channel formation layer of the display selection transistor in the display circuit.

The semiconductor layer 503b overlaps with the conductive layer 501d with the insulating layer 502 provided therebetween. The semiconductor layer 503b functions as a channel formation layer of the photodetection control transistor in the photodetector.

The semiconductor layer 503c overlaps with the conductive layer 501f with the insulating layer 502 provided therebetween. The semiconductor layer 503c functions as a channel formation layer of the output selection transistor in the photodetector.

The semiconductor layer 503d overlaps with the conductive layer 501g with the insulating layer 502 provided therebetween. The semiconductor layer 503d functions as a channel formation layer of the amplifier transistor in the photodetector.

The conductive layer 504a is electrically connected to the semiconductor layer 503a. The conductive layer 504a functions as one of a source and a drain of the display selection transistor in the display circuit.

The conductive layer 504b is electrically connected to the conductive layer 501b and the semiconductor layer 503a. The conductive layer 504b functions as the other of the source and the drain of the display selection transistor in the display circuit.

The conductive layer 504c overlaps with the conductive layer 501b with the insulating layer 502 provided therebetween. The conductive layer 504c functions as a second capacitor electrode of the storage capacitor in the display circuit.

The conductive layer 504d is electrically connected to the conductive layer 501c through an opening that penetrates the insulating layer 502. The conductive layer 504d functions as one of a first current terminal and a second current terminal of a photoelectric conversion element in the photodetector.

The conductive layer 504e is electrically connected to the semiconductor layer 503b. The conductive layer 504e functions as one of a source and a drain of the photodetection control transistor in the photodetector.

The conductive layer 504f is electrically connected to the semiconductor layer 503b and is electrically connected to the conductive layer 501g through an opening that penetrates the insulating layer 502. The conductive layer 504f functions as the other of the source and the drain of the photodetection control transistor in the photodetector.

The conductive layer 504g is electrically connected to the conductive layer 501d and the conductive layer 501e through an opening that penetrates the insulating layer 502. The conductive layer 504g functions as a signal line through which a photodetection control signal is input.

The conductive layer 504h is electrically connected to the semiconductor layer 503c. The conductive layer 504h functions as one of a source and a drain of the output selection transistor in the photodetector.

The conductive layer 504i is electrically connected to the semiconductor layer 503c and the semiconductor layer 503d. The conductive layer 504i functions as the other of the source and the drain of the output selection transistor in the photodetector and one of a source and a drain of the amplifier transistor in the photodetector.

The conductive layer 504j is electrically connected to the semiconductor layer 503d and is electrically connected to the conductive layer 501h through an opening that penetrates the insulating layer 502. The conductive layer 501j functions as the other of the source and the drain of the amplifier transistor in the photodetector.

The conductive layer 504k is electrically connected to the conductive layer 501h through an opening that penetrates the insulating layer 502. The conductive layer 504k functions as a wiring through which the voltage $V_a$ or the voltage $V_b$ is input.

The insulating layer 505 is in contact with the semiconductor layers 503a to 503d with the conductive layers 504a to 504k provided therebetween.

The semiconductor layer 506 is electrically connected to the conductive layer 504d through an opening that penetrates the insulating layer 505.

The semiconductor layer 507 is in contact with the semiconductor layer 506.

The semiconductor layer 508 is in contact with the semiconductor layer 507.

The insulating layer 509 overlaps with the insulating layer 505, the semiconductor layer 506, the semiconductor layer 507, and the semiconductor layer 508. The insulating layer 509 functions as a planarization insulating layer in the display circuit and the photodetector. Note that the insulating layer 509 is not necessarily provided.

The conductive layer 510a is electrically connected to the conductive layer 504b through an opening that penetrates the insulating layers 505 and 509. The conductive layer 510a functions as a pixel electrode of a display element in the display circuit. Note that a layer that functions as a pixel electrode is also referred to as a pixel electrode.

The conductive layer 510b is electrically connected to the conductive layer 504c through an opening that penetrates the insulating layers 505 and 509. The conductive layer 510b functions as a wiring through which the voltage $V_c$ is input.

The conductive layer 510c is electrically connected to the conductive layer 504e through an opening that penetrates the insulating layers 505 and 509 and is electrically connected to the semiconductor layer 508 through an opening that penetrates the insulating layers 505 and 509.

Figure 15A:
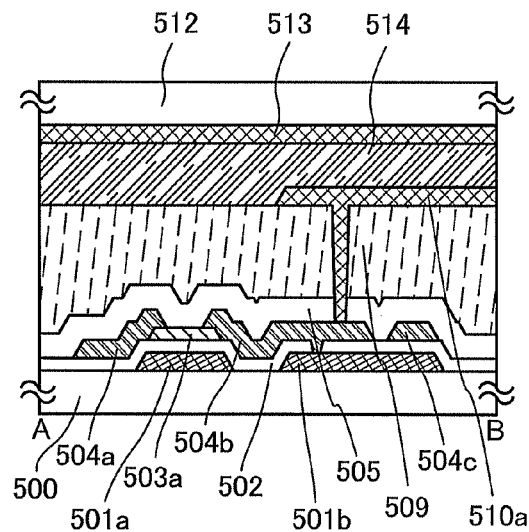
FIGS. 15A and 15B illustrate a structure example of an input-output device in Embodiment 6.
Figure 15B:
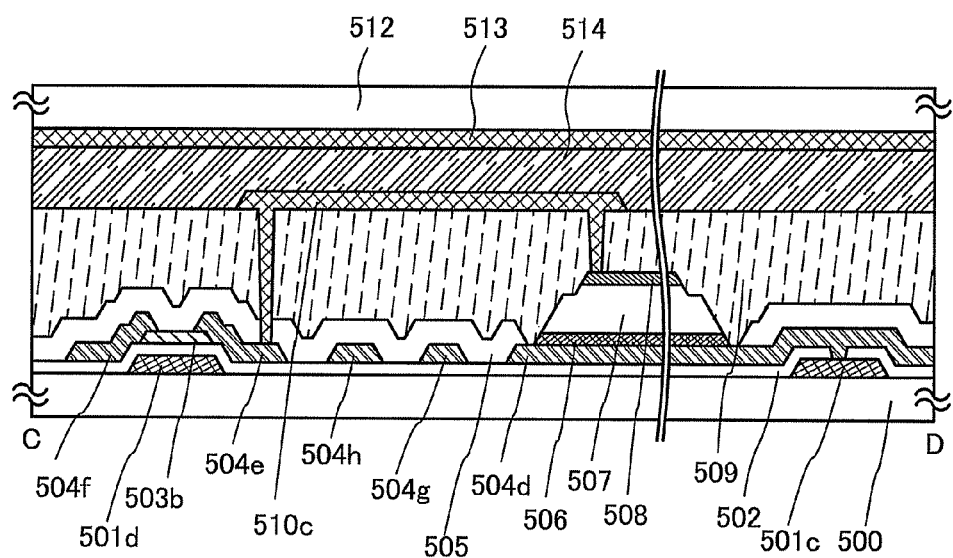

A structure example of the input-output device in this embodiment is described with reference to FIGS. 15A and 15B. FIGS. 15A and 15B are schematic cross-sectional views illustrating the structure example of the input-output device in this embodiment. FIG. 15A is a schematic cross-sectional view of a display circuit, and FIG. 15B is a schematic cross-sectional view of a photodetector. Note that a display element is a liquid crystal element, for example.

The input-output device illustrated in FIGS. 15A and 15B includes a substrate 512, a conductive layer 513, and a liquid crystal layer 514 in addition to the active matrix substrate illustrated in FIGS. 13A and 13B and FIGS. 14A and 14B.

The conductive layer 513 is provided on one surface of the substrate 512. The conductive layer 513 functions as a common electrode in the display circuit. Note that in the photodetector, the conductive layer 513 is not necessarily provided.

The liquid crystal layer 514 is provided between the conductive layer 510a and the conductive layer 513 and overlaps with the semiconductor layer 508 with the insulating layer 509 provided therebetween.

Note that the conductive layer 510a, the liquid crystal layer 514, and the conductive layer 513 function as a display element in the display circuit.

Further, the components of the input-output device illustrated in FIGS. 15A and 15B are described.

As each of the substrate 500 and the substrate 512, it is possible to use a substrate that can be used as the substrate 400a in FIG. 5A.

As the conductive layers 501a to 501h, it is possible to use a layer of a material that can be used for the conductive layer 401a in FIG. 5A. Alternatively, the conductive layers 501a to 501h may be formed using a stack of layers of materials that can be used for the conductive layer 401a.

As the insulating layer 502, it is possible to use a layer of a material that can be used for the insulating layer 402a in FIG. 5A. Alternatively, the insulating layer 502 may be formed using a stack of layers of materials that can be used for the insulating layer 402a.

As the semiconductor layers 503a to 503d, it is possible to use a layer of a material that can be used for the oxide semiconductor layer 403a in FIG. 5A. Note that as the semiconductor layers 503a to 503d, a semiconductor layer using a semiconductor that belongs to Group 14 in the periodic table (e.g., silicon) may be used.

As the conductive layers 504a to 504k, it is possible to use a layer of a material that can be used for the conductive layer 405a or the conductive layer 406a in FIG. 5A. Alternatively, the conductive layers 504a to 504k may be formed using a stack of layers of materials that can be used for the conductive layer 405a or the conductive layer 406a.

As the insulating layer 505, it is possible to use a layer of a material that can be used for the oxide insulating layer 407a in FIG. 5A. Alternatively, the insulating layer 505 may be formed using a stack of layers of materials that can be used for the oxide insulating layer 407a.

The semiconductor layer 506 is a semiconductor layer with one conductivity (one of p-type conductivity or n-type conductivity). As the semiconductor layer 506, a semiconductor layer containing silicon can be used, for example.

The semiconductor layer 507 has lower resistance than the semiconductor layer 506. As the semiconductor layer 507, a semiconductor layer containing silicon can be used, for example.

The semiconductor layer 508 is a semiconductor layer whose conductivity is different from the conductivity of the semiconductor layer 506 (the other of the p-type conductivity and the n-type conductivity). As the semiconductor layer 508, a semiconductor layer containing silicon can be used, for example.

As the insulating layer 509, for example, a layer of an organic material such as polyimide, acrylic, or benzocyclobutene can be used. Alternatively, as the insulating layer 509, a layer of a low-dielectric constant material (also referred to as a low-k material) can be used.

As the conductive layers 510a to 510c and the conductive layer 513, for example, a layer of a light-transmitting conductive material such as indium tin oxide, a metal oxide in which zinc oxide is mixed in indium oxide (such a metal oxide is also referred to as indium zinc oxide (IZO)), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, or indium tin oxide containing titanium oxide can be used.

The conductive layers 510a to 510c and the conductive layer 513 can be formed using a conductive composition containing a conductive high-molecular compound (also referred to as a conductive polymer). A conductive layer formed using the conductive composition preferably has a sheet resistance of 10000 ohm/square or less and a transmittance of 70% or more at a wavelength of 550 nm. Further, the resistivity of the conductive high-molecular compound contained in the conductive composition is preferably 0.1 Ω·cm or less.

As the conductive high-molecular compound, a so-called π electron conjugated conductive high-molecular compound can be used. For example, polyaniline and/or a derivative thereof, polypyrrole and/or a derivative thereof, polythiophene and/or a derivative thereof, and a copolymer of two or more kinds of those materials can be given as the π electron conjugated conductive high-molecular compound.

The liquid crystal layer 514 can be, for example, a layer containing a TN liquid crystal, an OCB liquid crystal, an STN liquid crystal, a VA liquid crystal, an ECB liquid crystal, a GH liquid crystal, a polymer dispersed liquid crystal, or a discotic liquid crystal can be used. Note that for the liquid crystal layer 514, a liquid crystal that transmits light when voltage applied to the conductive layer 510c and the conductive layer 513 is 0 V is preferably used.

As described with reference to FIGS. 13A and 13B, FIGS. 14A and 14B, and FIGS. 15A and 15B, the structure example of the input-output device in this embodiment includes the active matrix substrate provided with the transistor, the pixel electrode, and the photoelectric conversion element, a counter substrate, and the liquid crystal layer having a liquid crystal between the active matrix substrate and the counter substrate. With such a structure, the display circuit and the photodetector can be manufactured over one substrate in the same steps; thus, manufacturing cost can be reduced.

Embodiment 7

In this embodiment, electronic devices each including the input-output device described in the above embodiment are described.

Structure examples of electronic devices in this embodiment are described with reference to FIGS. 16A to 16F. FIGS. 16A to 16F illustrate the structure examples of the electronic devices in this embodiment.

Figure 16A:
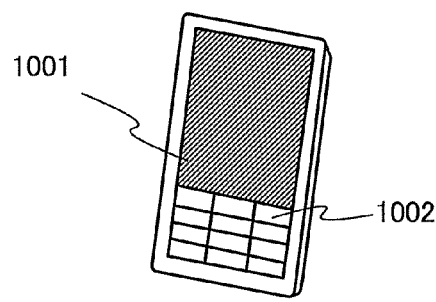
FIGS. 16A to 16F illustrate structure examples of electronic devices in Embodiment 7.

The electronic device illustrated in FIG. 16A is a personal digital assistant. The personal digital assistant illustrated in FIG. 16A includes at least an input-output portion 1001. In the personal digital assistant illustrated in FIG. 16A, for example, the input-output portion 1001 can be provided with an operation portion 1002. For example, when the input-output device in the above embodiment is used for the input-output portion 1001, operation of the personal digital assistant or input of data to the personal digital assistant can be performed with a finger or a pen.

Figure 16B:
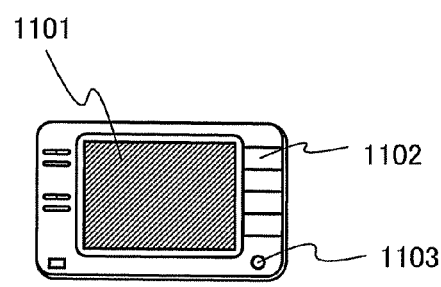

The electronic device illustrated in FIG. 16B is an information guide terminal including a car navigation system, for example. The information guide terminal illustrated in FIG. 16B includes an input-output portion 1101, operation buttons 1102, and an external input terminal 1103. For example, when the input-output device in the above embodiment is used for the input-output portion 1101, operation of the information guide terminal or input of data to the information guide terminal can be performed with a finger or a pen.

Figure 16C:
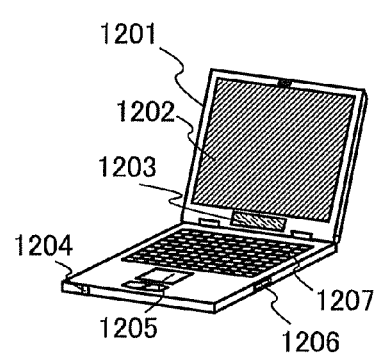

The electronic device illustrated in FIG. 16C is a laptop personal computer. The laptop personal computer illustrated in FIG. 16C includes a housing 1201, an input-output portion 1202, a speaker 1203, an LED lamp 1204, a pointing device 1205, a connection terminal 1206, and a keyboard 1207. For example, when the input-output device in the above embodiment is used for the input-output portion 1202, operation of the laptop personal computer or input of data to the laptop personal computer can be performed with a finger or a pen. Further, the input-output device in the above embodiment may be used for the pointing device 1205.

Figure 16D:
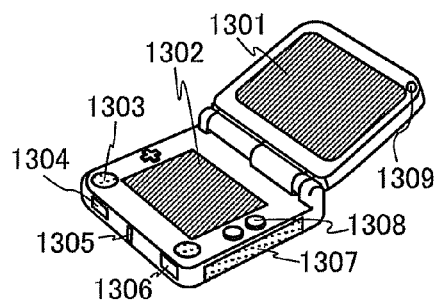

The electronic device illustrated in FIG. 16D is a portable game machine. The portable game machine illustrated in FIG. 16D includes an input-output portion 1301, an input-output portion 1302, a speaker 1303, a connection terminal 1304, an LED lamp 1305, a microphone 1306, a recording medium read portion 1307, operation buttons 1308, and a sensor 1309. For example, when the input-output device in the above embodiment is used for either one or both the input-output portion 1301 and the input-output portion 1302, operation of the portable game machine or input of data to the portable game machine can be performed with a finger or a pen.

Figure 16E:
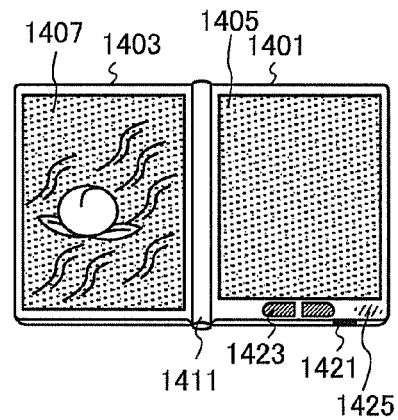

The electronic device illustrated in FIG. 16E is an e-book reader. The e-book reader illustrated in FIG. 16E includes at least a housing 1401, a housing 1403, an input-output portion 1405, an input-output portion 1407, and a hinge 1411.

The housing 1401 and the housing 1403 are connected to each other with the hinge 1411 so that the e-book reader illustrated in FIG. 16E can be opened and closed with the hinge 1411 used as an axis. With such a structure, the e-book reader can operate like a paper book. The input-output portion 1405 and the input-output portion 1407 are incorporated in the housing 1401 and the housing 1403, respectively. The input-output portion 1405 and the input-output portion 1407 may display different images. For example, one image can be displayed across both the input-output portions. In the case where different images are displayed on the input-output portion 1405 and the input-output portion 1407, for example, text may be displayed on the input-output portion on the right side (the input-output portion 1405 in FIG. 16E) and an image may be displayed on the input-output portion on the left side (the input-output portion 1407 in FIG. 16E).

In addition, in the e-book reader illustrated in FIG. 16E, the housing 1401 or the housing 1403 may be provided with an operation portion or the like. For example, the e-book reader illustrated in FIG. 16E may include a power switch 1421, operation keys 1423, and a speaker 1425. In the e-book reader illustrated in FIG. 16E, pages of an image with the plurality of pages can be turned with the operation key 1423. Further, in the e-book reader illustrated in FIG. 16E, a keyboard, a pointing device, or the like may be provided in either one or both the input-output portion 1405 and the input-output portion 1407. Furthermore, in the e-book reader illustrated in FIG. 16E, an external connection terminal (e.g., an earphone terminal, a USB terminal, or a terminal that can be connected to an AC adapter or a variety of cables such as USB cables), a recording medium insertion portion, or the like may be provided on the back surface or side surface of the housing 1401 and the housing 1403. The e-book reader illustrated in FIG. 16E may function as an electronic dictionary.

For example, when the input-output device in the above embodiment is used for either one or both the input-output portion 1405 and the input-output portion 1407, operation of the e-book reader or input of data to the e-book reader can be performed with a finger or a pen.

Figure 16F:
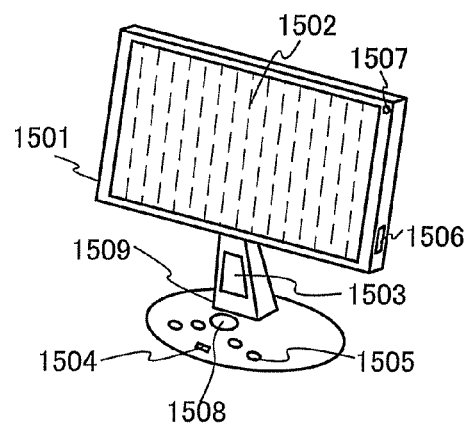

The electronic device illustrated in FIG. 16F is a display. The display illustrated in FIG. 16F includes a housing 1501, an input-output portion 1502, a speaker 1503, an LED lamp 1504, operation buttons 1505, a connection terminal 1506, a sensor 1507, a microphone 1508, and a support base 1509. For example, when the input-output device in the above embodiment is used for the input-output portion 1502, operation of the display or input of data to the display can be performed with a finger or a pen.

As described with reference to FIGS. 16A to 16F, the electronic devices in this embodiment each include an input-output portion in which the input-output device in the above embodiment is used. With such a structure, the influence of light in an environment in which the electronic device is placed can be reduced, so that the accuracy of photodetection in the input-output portion can be improved.

This application is based on Japanese Patent Application serial No. 2010-137092 filed with Japan Patent Office on Jun. 16, 2010, the entire contents of which are hereby incorporated by reference.

What is claimed is:

1. A method for driving an input-output device comprising a light-emitting device and a plurality of photodetectors arranged in matrix,
    wherein each of the plurality of photodetectors comprises a photoelectric conversion element, a first transistor, a second transistor, and a third transistor,
    wherein a first terminal of the photoelectric conversion element is electrically connected to a first terminal of the first transistor,
    wherein a second terminal of the first transistor is electrically connected to a gate of the second transistor,
    wherein a first terminal of the second transistor is electrically connected to a first terminal of the third transistor,
    wherein the first transistor comprises a channel formation layer comprising an oxide semiconductor, the method comprising the steps of:
    in each of a first frame period and a second frame period,
        emitting first light of a first color from the light-emitting device in a first sub frame period;
        emitting no light from the light-emitting device in a second sub frame period after the first sub frame period; and
        emitting second light of a second color from the light-emitting device in a third sub frame period after the second sub frame period;
    in the first sub frame period of the first frame period,
        inputting a first photodetection reset signal to a second terminal of the photoelectric conversion element of each of the plurality of photodetectors to reset the plurality of photodetectors; and
        inputting a first photodetection control signal to a gate of the first transistor of all of the plurality of photodetectors at once to generate first data of each of the plurality of photodetectors based on illuminance of light incident to the corresponding one of the plurality of photodetectors;
    inputting a first output selection signal generated by a shift register to a gate of the third transistor of each of the plurality of photodetectors selected by the first output selection signal to output the first data of the corresponding one of the plurality of photodetectors after the step of inputting the first photodetection control signal;
    in one of the second sub frame period to the third sub frame period of the second frame period,
        inputting a second photodetection reset signal to the second terminal of the photoelectric conversion element of each of the plurality of photodetectors to reset the plurality of photodetectors; and
        inputting a second photodetection control signal to the gate of the first transistor of all of the plurality of photodetectors at once to generate second data of each of the plurality of photodetectors based on illuminance of light incident to the corresponding one of the plurality of photodetectors;
    inputting a second output selection signal generated by the shift register to the gate of the third transistor of each of the plurality of photodetectors selected by the second output selection signal to output the second data of the corresponding one of the plurality of photodetectors after the step of inputting the second photodetection control signal,
    wherein the second photodetection control signal is the next signal of the first photodetection control signal input to the gate of the first transistor of all of the plurality of photodetectors.

2. The method for driving the input-output device, according to claim 1, further comprising the steps of;
    in the first sub frame period of the first frame period,
        inputting the first photodetection control signal to the gate of the first transistor of all of the plurality of photodetectors at once to generate the first data of each of the plurality of photodetectors based on illuminance of light incident to the corresponding one of the plurality of photodetectors,
    in the first sub frame period of the second frame period,
        inputting the second photodetection control signal to the gate of the first transistor of all of the plurality of photodetectors at once to generate the second data of each of the plurality of photodetectors based on illuminance of light incident to the corresponding one of the plurality of photodetectors.

3. The method for driving the input-output device, according to claim 2, wherein the input-output device comprises a display circuit, further comprising the steps of;
    in each of the first frame period and the second frame period,
        emitting no light from the light-emitting device in a fourth sub frame period after the third sub frame period; and
        emitting third light of a third color from the light-emitting device in a fifth sub frame period after the fourth sub frame period;
        inputting a first display data signal for the first color to set the display circuit in a first display state in the first sub frame period while emitting the first light;
        inputting a second display data signal for the second color to set the display circuit in a second display state in the third sub frame period while emitting the second light; and
        inputting a third display data signal for the third color to set the display circuit in a third display state in the fifth sub frame period while emitting the third light.

4. The method for driving the input-output device, according to claim 3, wherein the light-emitting device is a light-emitting diode.

5. The method for driving the input-output device, according to claim 2, wherein the first transistor comprises a channel formation layer comprising an oxide semiconductor with a carrier concentration of lower than $1\times10^{14}/cm^3$.

6. The method for driving the input-output device, according to claim 1, further comprising the steps of;
    in the first sub frame period of the first frame period,
        inputting the first photodetection control signal to the gate of the first transistor of all of the plurality of photodetectors at once to generate the first data of each of the plurality of photodetectors based on illuminance of light incident to the corresponding one of the plurality of photodetectors,
    in the second sub frame period of the second frame period,
        inputting the second photodetection control signal to the gate of the first transistor of all of the plurality of photodetectors at once to generate the second data of each of the plurality of photodetectors based on illuminance of light incident to the corresponding one of the plurality of photodetectors.

7. The method for driving the input-output device, according to claim 6, further comprising the steps of;
    generating third data corresponding to difference data between the first data and the second data.

8. The method for driving the input-output device, according to claim 7, wherein the input-output device comprises a display circuit, further comprising the steps of;
    in each of the first frame period and the second frame period,
        emitting no light from the light-emitting device in a fourth sub frame period after the third sub frame period; and
        emitting third light of a third color from the light-emitting device in a fifth sub frame period after the fourth sub frame period;
        inputting a first display data signal for the first color to set the display circuit in a first display state in the first sub frame period while emitting the first light;
        inputting a second display data signal for the second color to set the display circuit in a second display state in the third sub frame period while emitting the second light; and
        inputting a third display data signal for the third color to set the display circuit in a third display state in the fifth sub frame period while emitting the third light.

9. The method for driving the input-output device, according to claim 8, further comprising the steps of:
    in each of the first frame period and the second frame period,
        emitting no light from the light-emitting device in a sixth sub frame period after the fifth sub frame period.

10. The method for driving the input-output device, according to claim 9, wherein the light-emitting device is a light-emitting diode.

11. The method for driving the input-output device, according to claim 9, wherein the first transistor comprises a channel formation layer comprising an oxide semiconductor with a carrier concentration of lower than $1\times10^{14}/cm^3$.

12. A method for driving an input-output device comprising a light unit including Z (Z is a natural number of 3 or more) light-emitting diodes; X (X is a natural number) display circuits overlapping with the light unit; and Y (Y is a natural number of 2 or more) photodetectors arranged in matrix overlapping with the light unit,
    wherein each of the Y photodetectors comprises a photoelectric conversion element, a first transistor, a second transistor, and a third transistor,
    wherein a first terminal of the photoelectric conversion element is electrically connected to a first terminal of the first transistor,
    wherein a second terminal of the first transistor is electrically connected to a gate of the second transistor,
    wherein a first terminal of the second transistor is electrically connected to a first terminal of the third transistor,
    wherein the first transistor comprises a channel formation layer comprising an oxide semiconductor,
    the method comprising the steps of:
    in each of a first frame period and a second frame period,
        emitting first light of a first color from the Z light-emitting diodes of the light unit sequentially in a first sub frame period;
        emitting no light from the Z light-emitting diodes of the light unit in a second sub frame period after the first sub frame period; and
        emitting second light of a second color from the Z light-emitting diodes of the light unit sequentially in a third sub frame period after the second sub frame period;
        inputting a display selection signal and a first display data signal for the first color to the X display circuits before emitting the first light;
        setting the X display circuits in a first display state in accordance with data of the first display data signal in the first sub frame period while emitting the first light;
        inputting the display selection signal and a second display data signal for the first color to the X display circuits before emitting the second light; and
        setting the X display circuits in a second display state in accordance with data of the second display data signal in the third sub frame period while emitting the second light;
    in the first sub frame period of the first frame period,
        inputting a first photodetection reset signal to a second terminal of the photoelectric conversion element of each of the Y photodetectors to reset the Y photodetectors; and
        inputting a first photodetection control signal to a gate of the first transistor of all of the Y photodetectors at once to generate Y pieces of first data of each of the Y photodetectors based on illuminance of light incident to the corresponding one of the Y photodetectors;

inputting a first output selection signal generated by a shift register to a gate of the third transistor of each of the Y photodetectors selected by the first output selection signal to output the corresponding one of the Y pieces of the first data of the corresponding one of the Y photodetectors after the step of inputting the first photodetection control signal;

in one of the second sub frame period to the third sub frame period of the second frame period, inputting a second photodetection reset signal to the second terminal of the photoelectric conversion element of each of the Y photodetectors to reset the Y photodetectors; and inputting a second photodetection control signal to the gate of the first transistor of all of the Y photodetectors at once to generate Y pieces of second data of each of the Y photodetectors based on illuminance of light incident to the corresponding one of the Y photodetectors;

inputting a second output selection signal generated by the shift register to the gate of the third transistor of each of the Y photodetectors selected by the second output selection signal to output the corresponding one of the Y pieces of the second data of the corresponding one of the Y photodetectors after the step of inputting the second photodetection control signal, wherein the second photodetection control signal is the next signal of the first photodetection control signal input to the gate of the first transistor of all of the Y photodetectors.

13. The method for driving an input-output device, according to claim 12, further comprising the steps of:

in each of the first frame period and the second frame period, emitting no light from the Z light-emitting diodes of the light unit in a fourth sub frame period after the third sub frame period;

in the first sub frame period of the first frame period, inputting the first photodetection control signal to the gate of the first transistor of all of the Y photodetectors at once to generate the Y pieces of the first data of each of the Y photodetectors based on illuminance of light incident to the corresponding one of the Y photodetectors, in the second sub frame period of the second frame period, inputting the second photodetection control signal to the gate of the first transistor of all of the Y photodetectors at once to generate the Y pieces of the second data of each of the Y photodetectors based on illuminance of light incident to the corresponding one of the Y photodetectors, generating third data corresponding to difference data between the first data and the second data.

14. An input-output device comprising:

a light unit comprising Z (Z is a natural number of 3 or more) light-emitting diodes;

X (X is a natural number) display circuits over the light unit;

Y (Y is a natural number of 2 or more) photodetectors arranged in matrix over the light unit;

a reading circuit; and a data processing circuit, wherein each of the Y photodetectors comprises a photoelectric conversion element, a first transistor, a second transistor, and a third transistor, wherein a first terminal of the photoelectric conversion element is electrically connected to a first terminal of the first transistor, wherein a second terminal of the first transistor is electrically connected to a gate of the second transistor, wherein a first terminal of the second transistor is electrically connected to a first terminal of the third transistor, wherein the first transistor comprises a channel formation layer comprising an oxide semiconductor, wherein, in each of a first frame period and a second frame period, the Z light-emitting diodes of the light unit are configured to emit first light of a first color sequentially in a first sub frame period, emit no light in a second sub frame period after the first sub frame period, and emit second light of a second color sequentially in a third sub frame period after the second sub frame period, wherein, in each of the first frame period and the second frame period, the X display circuits are configured to receive a first display selection signal and a first display data signal to be in a first display state in accordance with data of the first display data signal in the first sub frame period and receive a second display selection signal and a second display data signal to be in a second display state in accordance with data of the second display data signal in the second sub frame period, wherein the Y photodetectors are configured to receive a first photodetection reset signal to a second terminal of the photoelectric conversion element of each of the Y photodetectors to reset the Y photodetectors in the first sub frame period of the first frame period, wherein all of the Y photodetectors are configured to receive a first photodetection control signal to a gate of the first transistor of all of the Y photodetectors at once to generate Y pieces of first data of each of the Y photodetectors based on illuminance of light incident to the corresponding one of the Y photodetectors in the first sub frame period of the first frame period, wherein the Y photodetectors are configured to receive a first output selection signal generated by a shift register to a gate of the third transistor of each of the Y photodetectors selected by the first output selection signal to output the corresponding one of the Y pieces of the first data of the corresponding one of the Y photodetectors after all of the Y photodetectors receive the first photodetection control signal, wherein the Y photodetectors are configured to receive a second photodetection reset signal to the second terminal of the photoelectric conversion element of each of the Y photodetectors to reset the Y photodetectors in the second sub frame period of the second frame period, wherein all of the Y photodetectors are configured to receive a second photodetection control signal to the gate of the first transistor of all of the Y photodetectors at once to generate Y pieces of second data of each of the Y photodetectors based on illuminance of light incident to the corresponding one of the Y photodetectors in the second sub frame period of the second frame period, wherein the Y photodetectors are configured to receive a second output selection signal generated by the shift register to the gate of the third transistor of each of the Y photodetectors selected by the second output selection signal to output the corresponding one of the Y pieces of the second data of the corresponding one of the Y photodetectors after all of the Y photodetectors receive a second photodetection control signal, wherein the reading circuit is configured to read the first data and the second data, wherein the data processing circuit is configured to generate difference data between the first data and the second data, and wherein the second photodetection control signal is the next signal of the first photodetection control signal input to the gate of the first transistor of all of the Y photodetectors.

15. The input-output device according to claim 14, wherein at least one of the first transistor and the second transistor is a field-effect transistor.

16. The input-output device according to claim 14, wherein at least one of the first transistor and the second transistor comprises a channel formation layer comprising an oxide semiconductor with a carrier concentration of lower than $1\times10^{14}/cm^3$.

17. The method for driving the input-output device, according to claim 1, further comprising the steps of;

in the first sub frame period of the first frame period,
inputting the first photodetection control signal to the gate of the first transistor of all of the plurality of photodetectors at once to generate the first data of each of the plurality of photodetectors based on illuminance of light incident to the corresponding one of the plurality of photodetectors, in the third sub frame period of the second frame period,
inputting the second photodetection control signal to the gate of the first transistor of all of the plurality of photodetectors at once to generate the second data of each of the plurality of photodetectors based on illuminance of light incident to the corresponding one of the plurality of photodetectors.

* * * * *